US012283827B2

(12) United States Patent
Hajimiri et al.

(10) Patent No.: US 12,283,827 B2
(45) Date of Patent: Apr. 22, 2025

(54) RF RECEIVER

(71) Applicant: California Institute of Technology, Pasadena, CA (US)

(72) Inventors: Seyed Ali Hajimiri, La Canada, CA (US); Florian Bohn, Pasadena, CA (US); Behrooz Abiri, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 18/093,291

(22) Filed: Jan. 4, 2023

(65) Prior Publication Data

US 2023/0142689 A1 May 11, 2023

Related U.S. Application Data

(60) Division of application No. 15/273,633, filed on Sep. 22, 2016, now Pat. No. 11,616,520, which is a (Continued)

(51) Int. Cl.
H02J 50/23 (2016.01)
H04B 1/16 (2006.01)
H02J 50/40 (2016.01)

(52) U.S. Cl.
CPC ............ *H02J 50/23* (2016.02); *H04B 1/1607* (2013.01); *H02J 50/40* (2016.02); *H02J 50/402* (2020.01)

(58) Field of Classification Search
CPC .......... H02J 50/23; H02J 50/40; H02J 50/402; H04B 1/1607

(Continued)

(56) References Cited

U.S. PATENT DOCUMENTS 1,119,732 A 12/1914 Tesla
5,400,037 A 3/1995 East
(Continued)

FOREIGN PATENT DOCUMENTS

CN 101162267 A 4/2008
CN 101309639 A 11/2008
(Continued)

OTHER PUBLICATIONS

Baarman, "Making Wireless Truly Wireless: The need for a universal Wireless Power Solution," Wireless Power Consortium, (Sep. 2009). [Retrieved from the Internet Jan. 9, 2017: https://www.wirelesspowerconsortium.com/technology/making-wireless- truly-wireless.html.

(Continued)

*Primary Examiner* — Elim Ortiz
(74) *Attorney, Agent, or Firm* — Weaver Austin Villeneuve & Sampson LLP

(57) ABSTRACT

A device includes, in part, an antenna adapted to receive an RF signal that includes modulated data, a splitter/coupler adapted to split the received RF signal, a receiver adapted to demodulate the data from a first portion of the RF signal, and a power recovery unit adapted to convert to a DC power a second portion of the RF signal. The splitter/coupler is optionally adjustable to split the RF signal in accordance with a value that may be representative of a number of factors, such as the target data rate, the DC power requirement of the device, and the like. The device optionally includes a switch and/or a power combiner adapted to deliver all the received RF power to the receiver depending on any number of operation conditions of the device or the device's distance from an RF transmitting device.

7 Claims, 18 Drawing Sheets

Related U.S. Application Data continuation-in-part of application No. 14/078,489, filed on Nov. 12, 2013, now Pat. No. 10,367,380.

(60) Provisional application No. 62/222,106, filed on Sep. 22, 2015, provisional application No. 61/724,638, filed on Nov. 9, 2012.

(58) Field of Classification Search
USPC ......... 307/104, 149; 342/372; 320/108, 109, 320/137; 455/127.1, 343.1
See application file for complete search history.

(56) References Cited

U.S. PATENT DOCUMENTS

| | | | |
|---|---|---|---|
| 6,127,799 A | 10/2000 | Krishnan | |
| 6,184,651 B1 | 2/2001 | Fernandez et al. | |
| 6,208,287 B1 | 3/2001 | Sikina et al. | |
| 6,404,268 B1 | 6/2002 | Hung et al. | |
| 6,664,770 B1 | 12/2003 | Bartels | |
| 6,946,950 B1 | 9/2005 | Ueno et al. | |
| 6,967,462 B1 | 11/2005 | Landis | |
| 7,027,311 B2 | 4/2006 | Vanderelli et al. | |
| 7,084,811 B1 | 8/2006 | Yap | |
| 7,212,414 B2 | 5/2007 | Baarman | |
| 7,356,952 B2 | 4/2008 | Sweeney et al. | |
| 7,522,878 B2 | 4/2009 | Baarman | |
| 7,554,316 B2 | 6/2009 | Stevens et al. | |
| 7,868,482 B2 | 1/2011 | Greene et al. | |
| 8,004,235 B2 | 8/2011 | Baarman et al. | |
| 8,284,055 B2 | 10/2012 | Butler et al. | |
| 8,396,173 B2 | 3/2013 | Ling et al. | |
| 8,829,972 B2 | 9/2014 | Nakaie et al. | |
| 9,030,161 B2 | 5/2015 | Lu et al. | |
| 9,124,125 B2 | 9/2015 | Leabman et al. | |
| 9,130,397 B2 | 9/2015 | Leabman et al. | |
| 9,130,602 B2 | 9/2015 | Cook et al. | |
| 9,154,002 B2 | 10/2015 | Norconk et al. | |
| 9,173,178 B2 | 10/2015 | Chakraborty et al. | |
| 9,252,846 B2 | 2/2016 | Lee et al. | |
| 9,601,267 B2 | 3/2017 | Widmer et al. | |
| 9,735,605 B2 | 8/2017 | Garcia et al. | |
| 9,772,401 B2 | 9/2017 | Widmer et al. | |
| 9,983,243 B2 | 5/2018 | Lafontaine et al. | |
| 10,003,278 B2 | 6/2018 | Hajimiri et al. | |
| 10,033,230 B2 | 7/2018 | Sindia et al. | |
| 10,090,714 B2 | 10/2018 | Bohn et al. | |
| 10,320,242 B2 | 6/2019 | Hajimiri et al. | |
| 10,367,380 B2 | 7/2019 | Sengupta et al. | |
| 10,673,351 B2 | 6/2020 | Hajimiri et al. | |
| 10,720,797 B2 | 7/2020 | Hajimiri et al. | |
| 11,095,164 B2 | 8/2021 | Bohn et al. | |
| 11,146,113 B2 | 10/2021 | Hajimiri et al. | |
| 11,502,552 B2 | 11/2022 | Sengupta et al. | |
| 11,616,401 B2 | 3/2023 | Sengupta et al. | |
| 11,616,402 B2 | 3/2023 | Sengupta et al. | |
| 11,616,520 B2 | 3/2023 | Hajimiri et al. | |
| 11,843,260 B2 | 12/2023 | Hajimiri et al. | |
| 2002/0030527 A1 | 3/2002 | Hung et al. | |
| 2002/0090966 A1 | 7/2002 | Hansen et al. | |
| 2004/0005863 A1 | 1/2004 | Carrender | |
| 2004/0266338 A1 | 12/2004 | Rowitch | |
| 2006/0121869 A1 | 6/2006 | Natarajan et al. | |
| 2006/0205381 A1 | 9/2006 | Beart et al. | |
| 2006/0287596 A1 | 12/2006 | Johnson et al. | |
| 2007/0178945 A1 | 8/2007 | Cook et al. | |
| 2007/0182367 A1 | 8/2007 | Partovi | |
| 2008/0014897 A1 | 1/2008 | Cook et al. | |
| 2008/0116847 A1 | 5/2008 | Loke et al. | |
| 2008/0227478 A1 | 9/2008 | Greene et al. | |
| 2008/0309452 A1 | 12/2008 | Zeine | |
| 2009/0011734 A1 | 1/2009 | Mertens et al. | |
| 2009/0143065 A1 | 6/2009 | Mattila | |
| 2009/0243397 A1* | 10/2009 | Cook ............... | H02J 50/12 |
| | | | 307/104 |
| 2009/0261779 A1 | 10/2009 | Zyren | |
| 2010/0033021 A1 | 2/2010 | Bennett | |
| 2010/0034238 A1 | 2/2010 | Bennett | |
| 2010/0048255 A1 | 2/2010 | Jojivet et al. | |
| 2010/0142509 A1* | 6/2010 | Zhu ................ | H02J 50/80 |
| | | | 370/343 |
| 2010/0181961 A1 | 7/2010 | Novak et al. | |
| 2010/0208848 A1 | 8/2010 | Zhu et al. | |
| 2010/0214159 A1 | 8/2010 | Ookawa et al. | |
| 2010/0231380 A1 | 9/2010 | Liu | |
| 2010/0231382 A1 | 9/2010 | Tayrani et al. | |
| 2010/0259447 A1 | 10/2010 | Crouch | |
| 2010/0277003 A1 | 11/2010 | Von Novak et al. | |
| 2010/0309078 A1 | 12/2010 | Rofougaran et al. | |
| 2010/0315045 A1 | 12/2010 | Zeine | |
| 2010/0323616 A1 | 12/2010 | Von Novak et al. | |
| 2011/0025133 A1 | 2/2011 | Sauerlaender et al. | |
| 2011/0050166 A1 | 3/2011 | Cook et al. | |
| 2011/0053500 A1 | 3/2011 | Menegoli et al. | |
| 2011/0124310 A1 | 5/2011 | Theilmann et al. | |
| 2011/0127848 A1 | 6/2011 | Ryu et al. | |
| 2011/0151789 A1 | 6/2011 | Viglione et al. | |
| 2011/0156640 A1 | 6/2011 | Moshfeghi | |
| 2011/0167291 A1 | 7/2011 | Liu et al. | |
| 2011/0181237 A1 | 7/2011 | Hamedi-Hagh et al. | |
| 2011/0218014 A1 | 9/2011 | Abu-Qahouq | |
| 2012/0091799 A1 | 4/2012 | Rofougaran et al. | |
| 2012/0126636 A1 | 5/2012 | Atsumi | |
| 2012/0217111 A1 | 8/2012 | Boys et al. | |
| 2012/0294054 A1 | 11/2012 | Kim et al. | |
| 2012/0306284 A1 | 12/2012 | Lee et al. | |
| 2012/0326660 A1 | 12/2012 | Lu et al. | |
| 2013/0062959 A1 | 3/2013 | Lee et al. | |
| 2013/0082651 A1 | 4/2013 | Park et al. | |
| 2013/0099584 A1 | 4/2013 | Von Novak, III | |
| 2013/0137455 A1 | 5/2013 | Xia et al. | |
| 2013/0169348 A1 | 7/2013 | Shi | |
| 2013/0201003 A1 | 8/2013 | Sabesan et al. | |
| 2013/0210477 A1 | 8/2013 | Peter | |
| 2013/0249682 A1 | 9/2013 | Van Wiemeersch et al. | |
| 2013/0343106 A1 | 12/2013 | Perreault et al. | |
| 2014/0008993 A1 | 1/2014 | Leabman | |
| 2014/0015344 A1 | 1/2014 | Mohamadi | |
| 2014/0112409 A1 | 4/2014 | Takei | |
| 2014/0175893 A1 | 6/2014 | Sengupta et al. | |
| 2014/0203768 A1 | 7/2014 | Andic et al. | |
| 2014/0333256 A1 | 11/2014 | Widmer et al. | |
| 2015/0015194 A1 | 1/2015 | Leabman et al. | |
| 2015/0022147 A1 | 1/2015 | Jung | |
| 2015/0130293 A1 | 5/2015 | Hajimiri et al. | |
| 2015/0144701 A1 | 5/2015 | Xian et al. | |
| 2015/0145350 A1 | 5/2015 | Hajimiri et al. | |
| 2015/0155739 A1 | 6/2015 | Walley et al. | |
| 2015/0372541 A1 | 12/2015 | Guo et al. | |
| 2016/0094091 A1 | 3/2016 | Shin et al. | |
| 2016/0134150 A1 | 5/2016 | Chen et al. | |
| 2016/0181873 A1 | 6/2016 | Mitcheson et al. | |
| 2016/0190872 A1 | 6/2016 | Bohn et al. | |
| 2016/0285481 A1 | 9/2016 | Cohen | |
| 2016/0380439 A1 | 12/2016 | Shao et al. | |
| 2017/0111073 A1 | 4/2017 | Hajimiri et al. | |
| 2017/0237469 A1 | 8/2017 | Taghivand et al. | |
| 2018/0226841 A1 | 8/2018 | Sengupta et al. | |
| 2018/0233963 A1 | 8/2018 | Sengupta et al. | |
| 2018/0233964 A1 | 8/2018 | Sengupta et al. | |
| 2019/0006888 A1 | 1/2019 | Hajimiri et al. | |
| 2019/0044390 A1 | 2/2019 | Hajimiri et al. | |
| 2019/0245389 A1 | 8/2019 | Johnston et al. | |
| 2019/0260237 A1 | 8/2019 | Bohn et al. | |
| 2020/0083752 A1 | 3/2020 | Bohn et al. | |
| 2022/0278559 A1 | 9/2022 | Hijimiri et al. | |
| 2023/0238713 A1 | 7/2023 | Sengupta et al. | |

FOREIGN PATENT DOCUMENTS

| | | |
|---|---|---|
| CN | 101978746 A | 2/2011 |
| CN | 102089952 A | 6/2011 |
| CN | 102396132 A | 3/2012 |
| CN | 102640394 A | 8/2012 |

(56) References Cited

FOREIGN PATENT DOCUMENTS

| | | |
|---|---|---|
| CN | 103155353 A | 6/2013 |
| CN | 103748764 A | 4/2014 |
| CN | 103763720 A | 4/2014 |
| CN | 103782521 A | 5/2014 |
| CN | 103843221 A | 6/2014 |
| CN | 104885333 A | 9/2015 |
| EP | 2858209 A1 | 4/2015 |
| JP | 2008178196 A | 7/2008 |
| JP | 2008245404 A | 10/2008 |
| JP | 2011199975 A | 10/2011 |
| JP | 2013005529 A | 1/2013 |
| JP | 2013538548 A | 10/2013 |
| KR | 20110133242 A | 12/2011 |
| KR | 20110135507 A | 12/2011 |
| KR | 20120005484 A | 1/2012 |
| KR | 20120020809 A | 3/2012 |
| KR | 20120069496 A | 6/2012 |
| KR | 20130020721 A | 2/2013 |
| KR | 20130035905 A | 4/2013 |
| KR | 20140008021 A | 1/2014 |
| TW | 201240402 A | 10/2012 |
| WO | WO-2007084716 A2 | 7/2007 |
| WO | WO-2010006078 A1 | 1/2010 |
| WO | WO-2010108191 A1 | 9/2010 |
| WO | WO-2012027166 A1 | 3/2012 |
| WO | WO-2013048132 A1 | 4/2013 |
| WO | WO-2013151259 A1 | 10/2013 |
| WO | WO-2014075103 A1 | 5/2014 |
| WO | WO-2014075109 A1 | 5/2014 |
| WO | WO-2015077726 A1 | 5/2015 |
| WO | WO-2015077730 A1 | 5/2015 |
| WO | WO-2016028939 A1 | 2/2016 |
| WO | WO-2017053631 A1 | 3/2017 |

OTHER PUBLICATIONS

Bellomo, L., et al., "Inverse Scattering Using a Time Reversal Radar," 2010 URSI International Symposium on Electromagnetic Theory, 2010, pp. 381-384.
CN Office Action dated Apr. 10, 2020, in CN Application No. 2016800650632.
CN Office Action dated Jan. 12, 2024 in Application No. CN202010099960.3 with English translation.
CN Office Action dated Jul. 26, 2017, in CN Application No. 201380069301.3.
CN Office Action dated Jul. 30, 2018, in CN Application No. 2015800438663.
CN Office Action dated Jun. 19, 2019, in CN Application No. 2015800438663.
CN Office Action dated Mar. 30, 2023 in Application No. CN202010099960.3 with English translation.
CN Office Action dated May 24, 2019, in CN Application No. 2016800650632.
CN Office Action dated Oct. 31, 2017, in CN Application No. 201480063373.1.
CN Office Action dated Sep. 29, 2016, in CN Application No. 201380069301.3.
CN Office Action dated Sep. 29, 2018, in CN Application No. 201480063373.1.
CN Office Action dated Sep. 5, 2017, in CN Application No. 201480063517.3.
Dickinson, "Evaluation of a Microwave High Power Reception Conversion Array for Wireless Power Transmission," Tech. Memo. 33-41, Jet Propulsion Laboratory, California Institute of Technology, (Sep. 1, 1975). [Retrieved from the Internet Jan. 9, 2017: https://ntrs.nasa.gov/archive/nasa/casi.ntrs.nasa.gov/19760004119.pdf.
Dickinson, "Performance of a High-Power, 2.388-GHz Receiving Array in Wireless Power Transmission Over 1.54 km," Microwave Symposium, 1976, IEEE-MTT-S International, pp. 139-141, IEEE, (1976).

EP Extended Search Report dated Jul. 14, 2017, in EP Application No. 14863147.6.
EP office action dated Dec. 6, 2021, in application No. EP13854148.7.
EP Office Action dated Jun. 8, 2018, in EP Application No. 14863147.6.
EP Office Action dated Mar. 30, 2021 in EP Application No. 16849637.0.
EP Office Action dated May 11, 2022, in Application No. EP16849637.0.
EP office action dated Sep. 11, 2023, in application No. EP13854148.7.
EP Search Report dated Apr. 9, 2019 in EP Application No. 16849637.0.
EP Search Report dated Dec. 21, 2020 in EP Application No. 20199533.9.
EP Search Report dated Jun. 16, 2020, in EP Application No. 13854148.7.
EP Search Report dated May 22, 2018 in EP Application No. 15833852.5.
EP Search Report dated May 26, 2017 in EP Application No. 14863210.2.
EP Supplementary European Search Report for application 13854148 issued Jun. 20, 2016.
European Office Action dated Jul. 14, 2022 in Application No. EP20199533.9.
Hirai, et al., "Practical Study on Wireless Transmission of Power and Information for Autonomous Decentralized Manufacturing System," IEEE Transactions on Industrial Electronics, 46(2):349-359, (1999).
IPRP dated Feb. 21, 2017 in PCT Application No. PCT/US2015/045969.
IPRP dated Jun. 2, 2016 in PCT Application PCT/US2014/067175.
IPRP dated Mar. 27, 2018 in PCT Application No. PCT/US2016/053202.
IPRP dated May 12, 2015 in PCT Application No. PCT/US2013/069757.
IPRP dated May 24, 2016 in PCT Application No. PCT/US2014/067187.
ISR & WO dated Dec. 9, 2016 in PCT Application No. PCT/US2016/053202.
ISR & WO dated Feb. 25, 2014 in PCT Application No. PCT/US2013/069757.
ISR & WO dated Mar. 16, 2015 in PCT Application No. PCT/US2014/067187.
ISR & WO dated Mar. 16, 2015 in PCT Application PCT/US2014/067175.
ISR & WO dated Oct. 23, 2015 in PCT Application No. PCT/US2015/045969.
Karalis, et al., "Efficient wireless non-radiative mid-range energy transfer," Annals of Physics, 323(2008):34-38, (2008).
Kotani et al., High-Efficiency Differential-Drive CMOS Rectifier for UHF RFIDs, IEEE Journal of Solid-State Circuits, 44(11):3011-3018, (2009).
KR office action dated May 30, 2022 in Application No. KR20217024751 with English translation.
KR Office Action dated Apr. 27, 2022 in Application No. KR1020217022372 with English translation.
KR Office Action dated Jan. 20, 2021 in KR Application No. 10-2016-7015112.
KR Office Action dated Jun. 12, 2020, in KR Application No. KR 10-2015-7014646.
KR Office Action dated May 8, 2021, in KR Application No. 10-2016-7015505.
KR Office Action dated Nov. 12, 2020 in KR Application No. 10-2017-7005942.
KR office action dated Nov. 25, 2021, in application No. KR20217024751 with English translation.
KR Office Action dated Oct. 14, 2019, in KR Application No. KR 10-2015-7014646.
KR Office Action dated Oct. 28, 2021 in Application No. KR1020217022372 with English translation.

(56) References Cited

OTHER PUBLICATIONS

Kurs, et al., "Wireless Power Transfer via Strongly Coupled Magnetic Resonances," Science, 371 (83):83-86, (2007).
Tong, "A Novel Differential Microstrip Patch Antenna and Array at 79 GHZ," Proc. Int.Antennas Propag. Symp., pp. 279-280, (2008). [Retrieved from the Internet Jan. 9, 2017: https://www.researchgate.net/profile/Christoph_Wagner4/publication/228992601_A_novel_differential_microstrip_patch_antenna_and_array_at_79_GHz/links/00b4952930cb62e535000000.pdf.
U.S. Notice of Allowance dated Jul. 8, 2022 in U.S. Appl. No. 15/952,124.
U.S. Appl. No. 14/078,489, Final Office Action mailed Feb. 24, 2017.
U.S. Appl. No. 14/078,489, Non-Final Office Action mailed May 12, 2016.
U.S. Appl. No. 14/552,414, Response to Non-Final Office Action filed Sep. 26, 2018.
U.S. Appl. No. 14/830,692, Notice of Allowance mailed Jun. 14, 2018.
U.S. Appl. No. 15/992,089, Non-Final Office Action mailed Jun. 7, 2019.
U.S. Appl. No. 15/992,089, Notice of Allowance mailed Mar. 23, 2020.
U.S. Appl. No. 16/143,332, Final Office Action mailed Dec. 26, 2019.
US Final Office Action dated Jun. 13, 2019, in U.S. Appl. No. 15/273,633.
US Final Office Action dated Mar. 4, 2021, in U.S. Appl. No. 15/273,633.
US Final Office Action dated May 13, 2020, in U.S. Appl. No. 15/942,211.
US Final Office Action dated May 13, 2020, in U.S. Appl. No. 15/952,124.
US Final Office Action dated May 13, 2020, in U.S. Appl. No. 15/952,128.
US Final Office Action dated Oct. 14, 2021, in U.S. Appl. No. 15/942,211.
US Final Office Action dated Oct. 14, 2021, in U.S. Appl. No. 15/952,128.
US Final Office Action dated Oct. 15, 2021, in U.S. Appl. No. 15/952,124.
US Final Office Action dated Oct. 26, 2017, in U.S. Appl. No. 14/552,414.
U.S. Non-Final office Action dated Aug. 29, 2022 in U.S. Appl. No. 17/498,656.
U.S. Non-Final Office Action dated Mar. 27, 2024 in U.S. Appl. No. 17/986,807.
U.S. Notice of Allowance dated Jul. 7, 2022 in U.S. Appl. No. 15/942,211.
U.S. Notice of Allowance dated Jul. 11, 2022 in U.S. Appl. No. 15/952,128.
US Notice of Allowance dated Apr. 13, 2021, in U.S. Appl. No. 16/143,332.
U.S. Notice of Allowance dated Apr. 18, 2023 in U.S. Appl. No. 17/498,656.
US Notice of Allowance dated Apr. 30, 2019, in U.S. Appl. No. 14/552,414.
US Notice of Allowance dated Apr. 9, 2021, in U.S. Appl. No. 16/109,591.
U.S. Notice of Allowance dated Aug. 9, 2023 in U.S. Appl. No. 17/498,656.
US Notice of Allowance dated Feb. 12, 2019, in U.S. Appl. No. 14/552,414.
US Notice of Allowance dated Feb. 22, 2018, in U.S. Appl. No. 14/552,249.
US Notice of Allowance dated Jan. 24, 2020, in U.S. Appl. No. 16/004,198.
U.S Notice of Allowance dated Jun. 20, 2022 in U.S. Appl. No. 15/273,633.
US Notice of Allowance dated Jun. 3, 2019, in U.S. Appl. No. 14/078,489.
US Notice of Allowance dated Mar. 23, 2022, in U.S. Appl. No. 15/952,128.
US Notice of Allowance dated Mar. 25, 2022, in U.S. Appl. No. 15/942,211.
US Notice of Allowance dated Mar. 28, 2022, in U.S. Appl. No. 15/942,211.
US Notice of Allowance dated May 18, 2018, in U.S. Appl. No. 14/830,692.
US Notice of Allowance dated Oct. 9, 2018, in U.S. Appl. No. 14/552,414.
US Office Action dated Aug. 2, 2017, in U.S. Appl. No. 14/552,249.
US Office Action dated Feb. 19, 2021, in U.S. Appl. No. 15/942,211.
US Office Action dated Feb. 19, 2021, in U.S. Appl. No. 15/952,128.
US Office Action dated Feb. 24, 2021, in U.S. Appl. No. 15/952,124.
US Office Action dated Feb. 25, 2022, in U.S. Appl. No. 15/952,124.
US Office Action dated Jan. 28, 2019, in U.S. Appl. No. 14/078,489.
US Office Action dated Jul. 15, 2019, in U.S. Appl. No. 16/004,198.
US Office Action dated Jul. 26, 2019, in U.S. Appl. No. 16/143,332.
US Office Action dated Jul. 29, 2019, in U.S. Appl. No. 15/942,211.
US Office Action dated Jul. 29, 2019, in U.S. Appl. No. 15/952,124.
US Office Action dated Jul. 29, 2019, in U.S. Appl. No. 15/952,128.
US Office Action dated Jun. 1, 2018, in U.S. Appl. No. 14/078,489.
US Office Action dated Mar. 24, 2017, in U.S. Appl. No. 14/552,414.
US Office Action dated Mar. 26, 2018, in U.S. Appl. No. 14/552,414.
US Office Action dated May 28, 2020, in U.S. Appl. No. 15/273,633.
US Office Action dated Oct. 16, 2017, in U.S. Appl. No. 14/830,692.
US Office Action dated Sep. 14, 2020, in U.S. Appl. No. 16/143,332.
US Office Action dated Sep. 20, 2018, in U.S. Appl. No. 15/273,633.
US Office Action dated Sep. 20, 2021, in U.S. Appl. No. 15/273,633.
US Office Action dated Sep. 22, 2017, in U.S. Appl. No. 14/078,489.
US Office Action dated Sep. 24, 2020, in U.S. Appl. No. 16/109,591.
Whitesides, "Researchers Beam 'Space' Solar Power in Hawaii," Wired Magazine, (Sep. 12, 2008). [Retrieved from the Internet Jan. 10, 2017: https://www.wired.com/2008/09/visionary-beams/.
WIPO Application No. PCT/US2018/034947, PCT International Preliminary Report on Patentability issued Nov. 26, 2019.
WIPO Application No. PCT/US2018/034947, PCT International Search Report and Written Opinion of the International Searching Authority mailed Aug. 3, 2018.
Young-Jin Moon et al, "A 3.0-W wireless power receiver circuit with 75% overall efficiency," 2012 IEEE Asian Solid State Circuits Conference (A-SSUS), Nov. 14, 2012, pp. 97-100.
Zheng, "Introduction to Air-to-air missiles system," Weapon Industry Press, Beijing, pp. 94-95, Dec. 31, 1997.
CN Office Action dated Apr. 24, 2024 in CN Application No. 202010099960.3 with English translation.
CN Office Action dated Nov. 1, 2024 in CN Application No. 202010099960.3 with English translation.
U.S. Final Office Action dated Sep. 16, 2024 in U.S. Appl. No. 17/986,807.
U.S. Notice of Allowance dated Feb. 4, 2025 in U.S. Appl. No. 17/986,807.

* cited by examiner

RF RECEIVER

CROSS-REFERENCE TO RELATED APPLICATIONS

An Application Data Sheet is filed concurrently with this specification as part of the present application. Each application that the present application claims benefit of or priority to as identified in the concurrently filed Application Data Sheet is incorporated by reference herein in their entireties and for all purposes.

The present application is a divisional of U.S. application Ser. No. 15/273,633, filed Sep. 22, 2016, entitled "RF Receiver"; and is also related to the following US Applications:

application Ser. No. 14/552,249, filed Nov. 24, 2014, entitled "Active CMOS Recovery Units For Wireless Power Transmission";

application Ser. No. 14/552,414, filed Nov. 24, 2014, entitled "Generator Unit For Wireless Power Transfer"; and application Ser. No. 14/830,692, filed Aug. 19, 2015, entitled "Wireless Power Transfer";

the contents of all of which applications are incorporated herein by reference in their entirety.

BACKGROUND OF THE INVENTION

The present invention relates to wireless communication, and more particularly to wireless power and data transfer.

BACKGROUND OF THE INVENTION

Electrical energy used in powering electronic devices comes predominantly from wired sources. Conventional wireless power transfer relies on magnetic inductive effect between two coils placed in close proximity of one another. To increase its efficiency, the coil size is selected to be less than the wavelength of the radiated electromagnetic wave. The transferred power diminishes strongly as the distance between the source and the charging device is increased.

BRIEF SUMMARY OF THE INVENTION

An RF lens, in accordance with one embodiment of the present invention, includes, in part, a multitude of radiators adapted to radiate electromagnetic waves to power a device positioned away from the RF lens. Each of the multitude of radiators operates at the same frequency. The phase of the electromagnetic wave radiated by each of the multitude of radiators is selected to be representative of the distance between that radiator and the device.

In one embodiment, the multitude of radiators are formed in an array. In one embodiment, the array is a one-dimensional array. In another embodiment, the array is a two-dimensional array. In one embodiment, the amplitudes of the electromagnetic waves radiated by the radiators is variable. In one embodiment, each of the multitude of radiators includes, in part, a variable delay element, a control circuit adapted to lock the phase or frequency of the electromagnetic wave radiated by that radiator to the phase or frequency of a reference signal, an amplifier, and an antenna.

In one embodiment, the multitude of radiators are formed in a first radiator tile adapted to receive a second radiator tile having disposed therein another multitude of radiators. In one embodiment, the RF lens is further adapted to track a position of the device. In one embodiment, each of a first subset of the radiators includes a circuit for receiving an electromagnetic wave transmitted by the device thus enabling the RF lens to determine the position of the device in accordance with the phases of the electromagnetic wave received by the first subset of the radiators.

In one embodiment, each of at least a first subset of the radiators includes a circuit for receiving an electromagnetic wave transmitted by the device thereby enabling the RF lens to determine a position of the device in accordance with a travel time of the electromagnetic wave from the device to each of the first subset of the radiators and a travel time of a response electromagnetic wave transmitted from the RF lens to the device. In one embodiment, the RF lens is formed in a semiconductor substrate.

A method of wirelessly powering a device, in accordance with one embodiment of the present invention, includes, in part, transmitting a multitude of electromagnetic waves having the same frequency from a multitude of radiators to the device, selecting a phase of each of the multitude of radiators in accordance with a distance between that radiator and the device, and charging the device using the electromagnetic waves received by the device.

In one embodiment, the method further includes, in part, forming the radiators in an array. In one embodiment, the radiators are formed in a one-dimensional array. In another embodiment, the radiators are formed in a two-dimensional array. In one embodiment, the method further includes, in part, varying the amplitude of the electromagnetic wave radiated by each of the radiators.

In one embodiment, each radiators includes, in part, a variable delay element, a controlled locked circuit adapted to lock the phase or the frequency of the electromagnetic wave radiated by the radiator to the phase or frequency of a reference signal, an amplifier, and an antenna. In one embodiment, the radiators are formed in a first radiator tile adapted to receive a second radiator tile having disposed therein another multitude of radiators.

In one embodiment, the method further includes, in part, tracking the position of the device. In one embodiment, the method further includes, in part, determining the position of the device in accordance with relative phases of an electromagnetic wave transmitted by the device and received by each of at least a subset of the radiators. In one embodiment, the method further includes, in part, determining the position of the device in accordance with a travel time of an electromagnetic wave transmitted by the device and received by each of at least a subset of the radiators, and further in accordance with a travel time of a response electromagnetic wave transmitted from the RF lens to the device. In one embodiment, the method further includes, in part, forming the RF lens in a semiconductor substrate.

A device, in accordance with one embodiment of the present invention, includes, in part, an antenna adapted to receive an RF signal that includes modulated data, a splitter/coupler adapted to split the received RF signal into first and second portions, a receiver adapted to demodulate the data from the first portion of the received RF signal, and a power recovery unit adapted to convert the second portion of the RF signal to a DC power to power the device. In one embodiment, the splitter/coupler is an adjustable splitter/coupler A device, in accordance with one embodiment of the present invention, includes, in part, an antenna adapted to receive an RF signal that includes modulated data, a receiver adapted to demodulate the data from a first portion of the RF signal, a power recovery unit adapted to convert a second portion of the RF signal to a DC power to power the device, and a controller adapted to receive the RF signal from the antenna and generate the first and second portions of the RF signal in accordance with impedance values of the receiver and the power recovery unit.

A device, in accordance with one embodiment of the present invention, includes, in part, an antenna adapted to receive an RF signal that includes modulated data, a switch adapted to receive the RF signal from the antenna, a power recovery unit adapted to convert the RF signal to a DC power to power the device when the switch is in a first position, and a receiver adapted to demodulate the data from the received RF signal when the switch is in a second position.

A device, in accordance with one embodiment of the present invention, includes, in part, an antenna adapted to receive an RF signal that includes modulated data, a splitter/coupler adapted to split the received RF signal into first and second portions, a switch adapted to receive the second portion of the RF signal from the splitter/coupler, a power recovery unit adapted to convert the second portion of the RF signal to a DC power to power the device when the switch is in a first position, and a power combiner adapted to receive the first portion of the RF signal from the splitter/coupler and further to receive the second portion of the RF signal when the switch is in a second position, and a receiver adapted to demodulate the data from an output signal of the power combiner. In one embodiment, the device further includes a controller adapted to cause the switch to be in the first position when a power of the received RF signal is less than a first threshold value. In one embodiment, the device further includes a controller adapted to cause the switch to be in the first position when the device indicates that its DC power exceeds a second threshold value.

A device, in accordance with one embodiment of the present invention, includes, in part, an antenna adapted to receive an RF signal that includes modulated data, a switch adapted to receive the RF signal from the antenna, a power combiner coupled to a first output terminal of the switch to receive the RF signal when the switch is in a first position, a splitter/coupler coupled to a second output terminal of the switch to receive the RF signal, when the switch is in a second position, to split the RF signal into a first portion and a second portion and deliver the first portion of the RF signal to the power combiner, a power recovery unit adapted to convert the first portion of the RF signal to a DC power to charge the device when the switch is in the second position, and a receiver adapted to demodulate the data from an output signal of the power combiner. In one embodiment, the device further includes, in part, a controller adapted to cause the switch to be in the first position when a power of the received RF signal is less than a threshold value. In yet another embodiment, the device further includes a controller adapted to cause the switch to be in the first position when the device indicates that its DC power exceeds a threshold value.

A device, in accordance with one embodiment of the present invention, includes, in part, an antenna adapted to receive an RF signal that includes modulated data, a controller, an adjustable splitter/coupler adapted to split the received RF signal into first and second portions in accordance with a value the adjustable splitter/coupler receives from the controller, a receiver adapted to demodulate the data from the first portion of the RF signal, and a power recovery unit adapted to convert the second portion of the RF signal to a DC power to charge the device. In one embodiment, the value supplied by the controller is defined by a target data rate of the device. In another embodiment, the value supplied by the controller is defined by a DC power requirement of the device.

A method, in accordance with one embodiment of the present invention, includes, in part, receiving an RF signal that includes modulated data, splitting the received RF signal to first and second portions, demodulating the data from the first portion of the RF signal, and converting the second portion of the RF signal to a DC power.

A method, in accordance with one embodiment of the present invention, includes, in part, receiving an RF signal that includes modulated data, demodulating the data from a first portion of the received RF signal via a receiver, converting a second portion of the RF signal to a DC power via a power recovery unit, and generating the first and second portions of the RF signal in accordance with impedance values of the receiver and the power recovery unit.

A method, in accordance with one embodiment of the present invention, includes, in part, receiving an RF signal that includes modulated data, converting the RF signal to a DC power when a switch is in a first position, and demodulating the data from the received RF signal when the switch is in a second position.

A method, in accordance with one embodiment of the present invention, includes, in part, receiving an RF signal that includes modulated data, demodulating the data using either a first portion of the RF signal or the RF signal, and converting a second portion of the RF signal to a DC power when the first portion of the RF signal is used for demodulating the data. In one embodiment, the data is modulated using the RF signal when a power of the received RF signal is less than a first threshold value. In one embodiment, the data is demodulated using the RF signal when an indication is received that a battery charge exceeds a threshold value.

A device, in accordance with one embodiment of the present invention, includes, in part, an antenna adapted to receive an RF signal that includes modulated data, a controller, an adjustable splitter/coupler adapted to split the received RF signal into first and second portions in accordance with a value the adjustable splitter/coupler receives from the controller, a receiver adapted to demodulate the data from the first portion of the RF signal, and a power recovery unit adapted to convert the second portion of the RF signal to a DC power to charge the device. In one embodiment, the value supplied by the controller is defined by a target data rate of the device. In another embodiment, the value supplied by the controller is defined by a DC power requirement of the device.

A method, in accordance with one embodiment of the present invention, includes, in part, receiving an RF signal, splitting the received RF signal to first and second portions in accordance with a received value, demodulating the data from the first portion of the RF signal, and converting the second portion of the RF signal to a DC power. In one embodiment, the value is defined by a target data rate. In one embodiment, the value is defined by a DC power requirement.

DETAILED DESCRIPTION OF THE INVENTION

An RF lens, in accordance with one embodiment of the present invention, includes a multitude of radiators adapted to transmit radio frequency electromagnetic EM waves (hereinafter alternatively referred to as EM waves, or waves) whose phases and amplitudes are modulated so as to concentrate the radiated power in a small volume of space (hereinafter alternatively referred to as focus point or target zone) in order to power an electronic device positioned in that space. Accordingly, the waves emitted by the radiators are caused to interfere constructively at the focus point. Although the description below is provided with reference to wireless power transfer, the following embodiments of the present invention may be used to transfer any other kind of information wirelessly.

Figure 1:
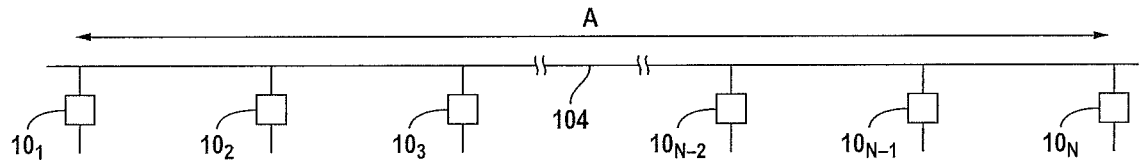
FIG. 1 shows a one-dimensional array of radiators forming an RF lens, in accordance with one embodiment of the present invention.
Figure 2:
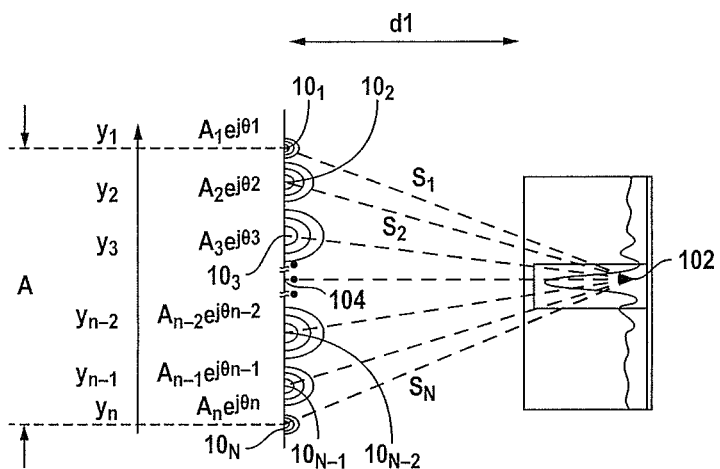
FIG. 2 is a side view of the RF lens of FIG. 1 wirelessly delivering power to a device at a first location, in accordance with one exemplary embodiment of the present invention.

FIG. 1 shows a multitude of radiators, arranged in an array 100, forming an RF lens, in accordance with one embodiment of the present invention. Array 100 is shown as including N radiators $10_1$, $10_2$, $10_3$ ... $10_{N-1}$, $10_N$ each adapted to radiate an EM wave whose amplitude and phase may be independently controlled in order to cause constructive interference of the radiated EM waves at a focus point where a device to be charged is located, where N is integer greater than 1. FIG. 2 is a side view of the array 100 when the relative phases of the waves generated by radiators $10_i$ (i is an integer ranging from 1 to N) are selected so as to cause constructive interference between the waves to occur near region 102 where a device being wirelessly charged is positioned, i.e., the focus point. Region 102 is shown as being positioned at approximately distance $d_1$ from center 104 of array 100. The distance between the array center and the focus point is alternatively referred to herein as the focal length. Although the following description of an RF lens is provided with reference to a one or two dimensional array of radiators, it is understood that an RF lens in accordance with the present invention may have any other arrangement of the radiators, such as a circular arrangement 1000 of radiators 202 as shown in FIG. 22A, or the elliptical arrangement 1010 of radiators 202 shown in FIG. 22B.

As seen from FIG. 2, each radiator $10_i$ is assumed to be positioned at distance $y_i$ from center 104 of array 100. The amplitude and phase of the wave radiated by radiator $10_i$ are assumed to be represented by $A_i$ and $\theta_i$ respectively. Assume further that the wavelength of the waves being radiated is represented by $\lambda$. To cause the waves radiated by the radiators to interfere constructively in region 102 (i.e., the desired focus point), the following relationship is satisfied between various phases $\theta_i$ and distances $y_i$:

$$\theta_1 + \frac{2\pi}{\lambda}\sqrt{d_1^2 + y_1^2} = \theta_2 + \frac{2\pi}{\lambda}\sqrt{d_1^2 + y_2^2} = \ldots = \theta_N + \frac{2\pi}{\lambda}\sqrt{d_1^2 + y_N^2}$$

Figure 3:
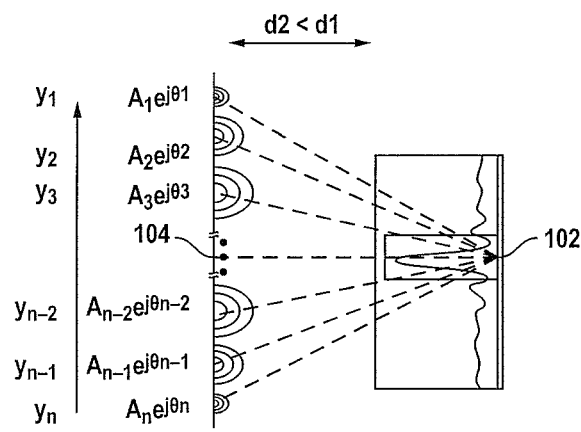
FIG. 3 is a side view of the RF lens of FIG. 1 wirelessly delivering power to a device at a second location, in accordance with one exemplary embodiment of the present invention.

Since the phase of an RF signal may be accurately controlled, power radiated from multiple sources may be focused, in accordance with the present invention, onto a target zone where a device to be wirelessly charged is located. Furthermore, dynamic phase control enables the tracking of the device as it moves from its initial location. For example, as shown in FIG. 3, if the device moves to a different position—along the focal plane—located at a distance $d_2$ from center point 104 of the array, in order to ensure that the target zone is also located at distance $d_2$, the phases of the sources may be adjusted in accordance with the following relationship:

$$\theta_1 + \frac{2\pi}{\lambda}\sqrt{d_2^2 + y_1^2} = \theta_2 + \frac{2\pi}{\lambda}\sqrt{d_2^2 + y_2^2} = \ldots = \theta_N + \frac{2\pi}{\lambda}\sqrt{d_2^2 + y_N^2} \quad (1)$$

Figure 4:
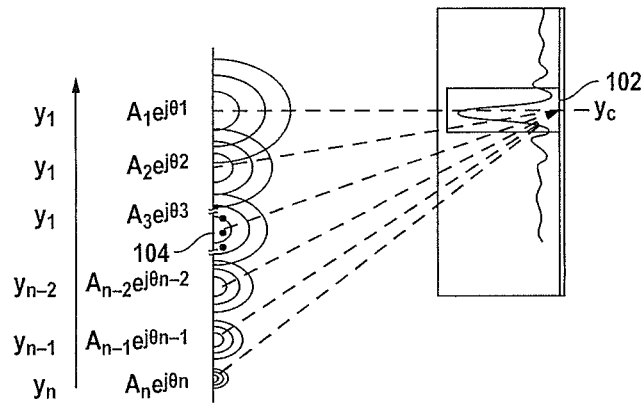
FIG. 4 is a side view of the RF lens of FIG. 1 wirelessly delivering power to a device at a third location, in accordance with one exemplary embodiment of the present invention.

Referring to FIG. 4, if the device moves to a different position away from the focal plane (e.g., to a different point along the y-axis) the radiators' phases are dynamically adjusted, as described below, so as to track and maintain the target zone focused on the device. Parameter $y_c$ represents the y-component of the device's new position, as shown in FIG. 4, from the focal plane of the array (i.e, the plane perpendicular to the y-axis and passing through center 104 of array 100).

$$\theta_1 + \frac{2\pi}{\lambda}\sqrt{d_2^2 + (y_1 - y_c)^2} = \quad (2)$$
$$\theta_2 + \frac{2\pi}{\lambda}\sqrt{d_2^2 + (y_2 - y_c)^2} = \ldots = \theta_N + \frac{2\pi}{\lambda}\sqrt{d_2^2 + (y_N - y_c)^2}$$

The amount of power transferred is defined by the wavelength A of the waves being radiated by the radiators, the array span or array aperture A as shown in FIG. 1, and the focal length, i.e. ($\lambda$F/A).

In one embodiment, the distance between each pair of radiators is of the order of the wavelength of the signal being radiated. For example, if the frequency of the radiated wave is 2.4 GHz (i.e., the wavelength is 12.5 cm), the distance between each two radiators may be a few tenths to a few tens of the wavelengths, that may vary depending on the application.

An RF lens, in accordance with the present invention, is operative to transfer power wirelessly in both near-field and far field regions. In the optical domain, a near field region is referred to as the Fresnel region and is defined as a region in which the focal length is of the order of the aperture size. In the optical domain, a far field region is referred to as the Fraunhofer region and is defined as a region in which the focal length (F) is substantially greater than ($2A^2/\lambda$).

To transfer power wirelessly to a device, in accordance with the present invention, the radiator phases are selected so as to account for differences in distances between the target point and the radiators. For example, assume that the focal length $d_1$ in FIG. 2 is of the order of the aperture size A. Therefore, since distances $S_1$, $S_2$, $S_3$ ... $S_N$ are different from one another, corresponding phases $\theta_1$, $\theta_2$, $\theta_3$ ... $\theta_N$ of radiators $10_1$, $10_2$, $10_3$ ... $10_N$ are varied so as to satisfy expression (1), described above. The size of the focus point (approximately $\lambda$F/A) is relatively small for such regions because of the diffraction limited length.

A radiator array, in accordance with the present invention, is also operative to transfer power wirelessly to a target device in the far field region where the focal length is greater than ($2A^2/\lambda$). For such regions, the distances from the different array elements to the focus spot are assumed be to be the same. Accordingly, for such regions, $S_1=S_2=S_3$ ... $=S_N$, and $\theta_1=\theta_2=\theta_3$ ... $=\theta_N$. The size of the focus point is relatively larger for such regions and thus is more suitable for wireless charging of larger appliances.

Figure 5:
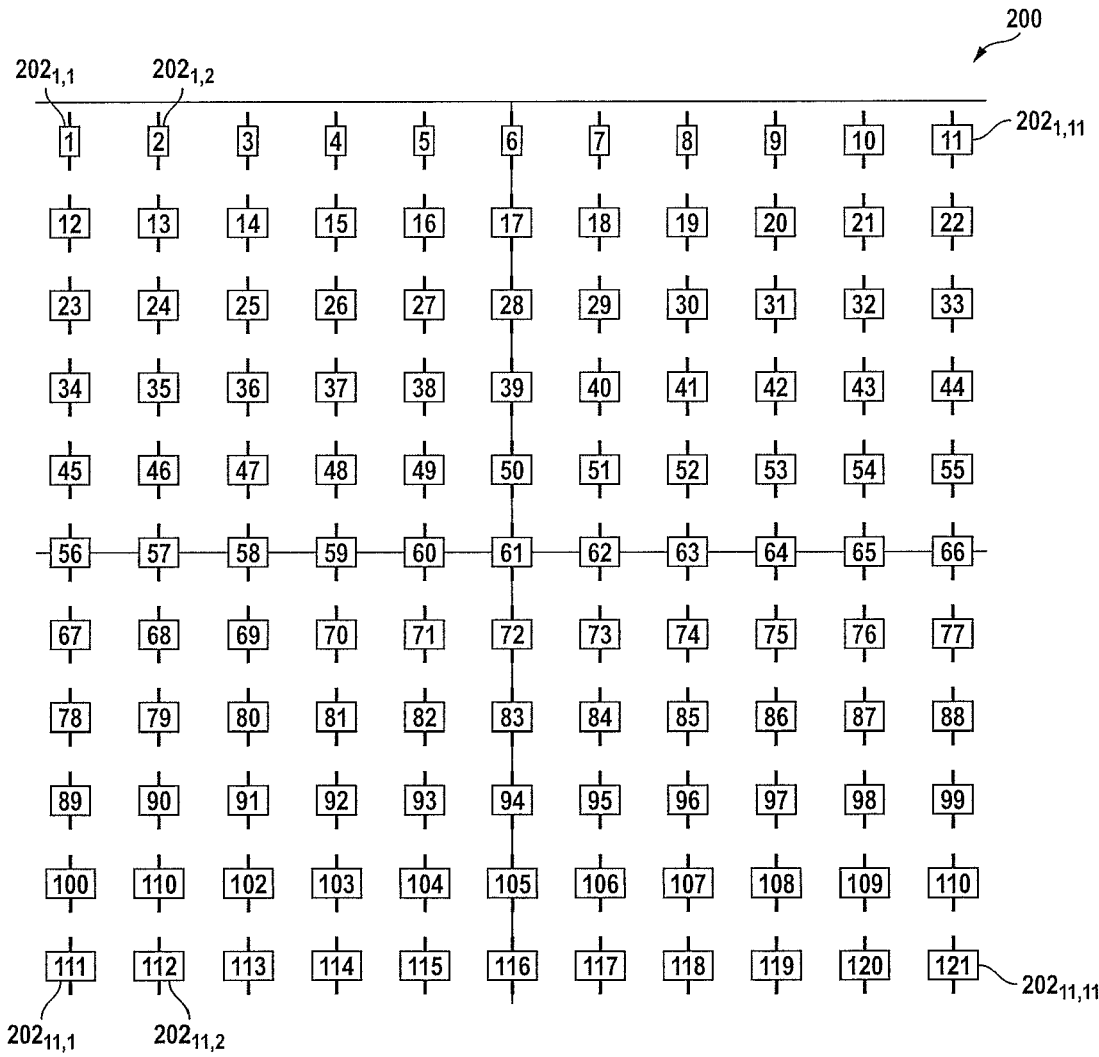
FIG. 5 shows a two-dimensional array of radiators forming an RF lens, in accordance with one exemplary embodiment of the present invention.

FIG. 5 shows an RF lens 200, in accordance with another embodiment of the present invention. RF lens 200 is shown as including a two dimensional array of radiators $202_{i,j}$ arranged along rows and columns. Although RF lens 200 is shown as including 121 radiators $202_{i,j}$ disposed along 11 rows and 11 columns (integers i and j are indices ranging from 1 to 11) it is understood that an RF lens in accordance with embodiments of the present invention may have any number of radiators disposed along U rows and V columns, where U and V are integers greater one. In the following description, radiators $202_{i,j}$ may be collectively or individually referred to as radiators 202.

As described further blow, the array radiators are locked to a reference frequency, which may be a sub-harmonic (n=1, 2, 3 ... ) of the radiated frequency, or at the same frequency as the radiated frequency. The phase of the wave radiated by each radiator are controlled independently in order to enable the radiated waves to constructively interfere and concentrate their power onto a target zone within any region in space.

Figure 6A:
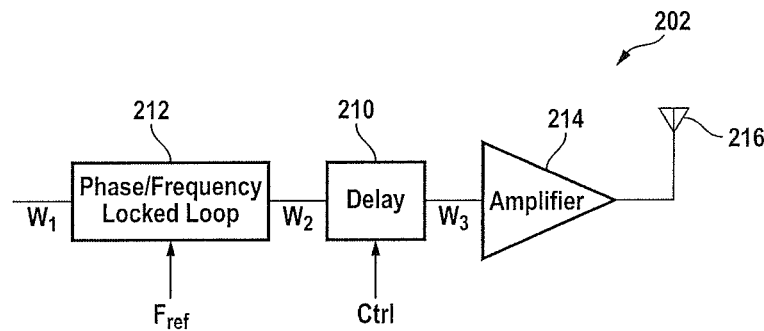
FIG. 6A is a simplified block diagram of a radiator disposed in an RF lens, in accordance with one exemplary embodiment of the present invention.

FIG. 6A is a simplified block diagram of a radiator 202 disposed in RF lens 200, in accordance with one embodiment of the present invention. As seen, radiator 202 is shown as including, in part, a programmable delay element (also referred to herein as phase modulator) 210, a phase/frequency locked loop 212, a power amplifier 214, and an antenna 216. Programmable delay element 210 is adapted to delay signal $W_2$ to generate signal $W_3$. The delay between signals $W_2$ and $W_3$ is determined in accordance with control signal Ctrl applied to the delay element. In one embodiment, phase/frequency locked loop 212 receives signal $W_1$ as well as a reference clock signal having a frequency $F_{ref}$ to generate signal $W_2$ whose frequency is locked to the reference frequency $F_{ref}$. In another embodiment, signal $W_2$ generated by phase/frequency locked loop 212 has a frequency defined by a multiple of the reference frequency $F_{ref}$. Signal $W_3$ is amplified by power amplifier 214 and transmitted by antenna 216. Accordingly and as described above, the phase of the signal radiated by each radiator 202 may be varied by an associated programmable delay element 210 disposed in the radiator.

Figure 6B:
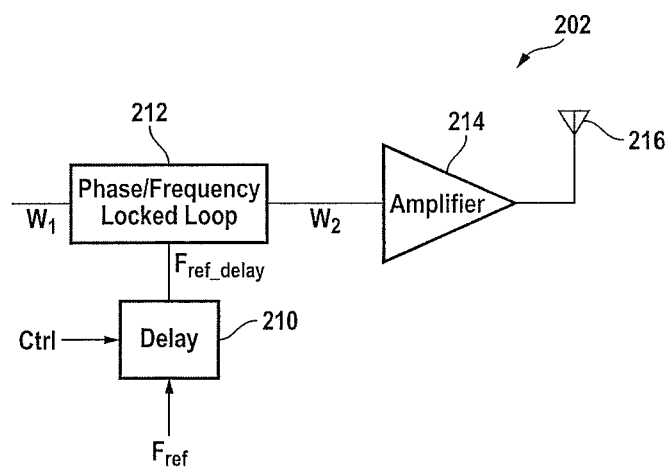
FIG. 6B is a simplified block diagram of a radiator disposed in an RF lens, in accordance with another exemplary embodiment of the present invention.

FIG. 6B is a simplified block diagram of a radiator 202 disposed in RF lens 200, in accordance with another embodiment of the present invention. As seen, radiator 202 is shown as including, in part, a programmable delay element 210, a phase/frequency locked loop 212, a power amplifier 214, and an antenna 216. Programmable delay element 210 is adapted to delay the reference clock signal $F_{ref}$ thereby to generate a delayed reference clock signal $F_{ref\_Delay}$. The delay between signals $F_{ref}$ and $F_{ref\_Delay}$ is determined in accordance with control signal Ctrl applied to the delay element 210. Signal $W_2$ generated by phase/frequency locked loop 212 has a frequency locked to the frequency of signal $F_{ref\_Delay}$ or a multiple of the frequency of signal $F_{ref\_Delay}$. In other embodiments (not shown), the delay element is disposed in and is part of phase/frequency locked loop 212. In yet other embodiments (not shown), the radiators may not have an amplifier.

Figure 7:
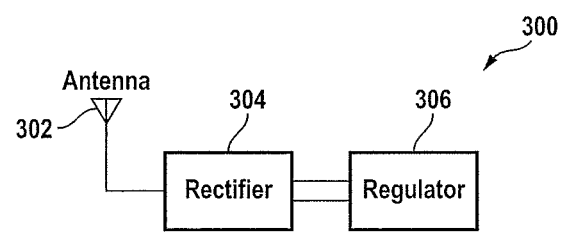
FIG. 7 shows a number of electronic components of a device adapted to be charged wirelessly, in accordance with one exemplary embodiment of the present invention.

FIG. 7 shows a number of components of a device 300 adapted to be charged wirelessly, in accordance with one embodiment of the present invention. Device 300 is shown as including, in part, an antenna 302, a rectifier 304, and a regulator 306. Antenna 302 receives the electromagnetic waves radiated by a radiator, in accordance with the present invention. Rectifier 304 is adapted to convert the received AC power to a DC power. Regulator 306 is adapted to regulate the voltage signal received from rectifier 304 and apply the regulated voltage to the device. High power transfer efficiency is obtained, in one embodiment, if the aperture area of the receiver antenna is comparable to the size of the target zone of the electromagnetic field. Since most of the radiated power is concentrated in a small volume forming the target zone, such a receiver antenna is thus optimized to ensure that most of the radiated power is utilized for charging up the device. In one embodiment, the device may be retro-fitted externally with components required for wireless charging. In another embodiment, existing circuitry present in the charging device, such as antenna, receivers, and the like, may be used to harness the power.

Figure 8:
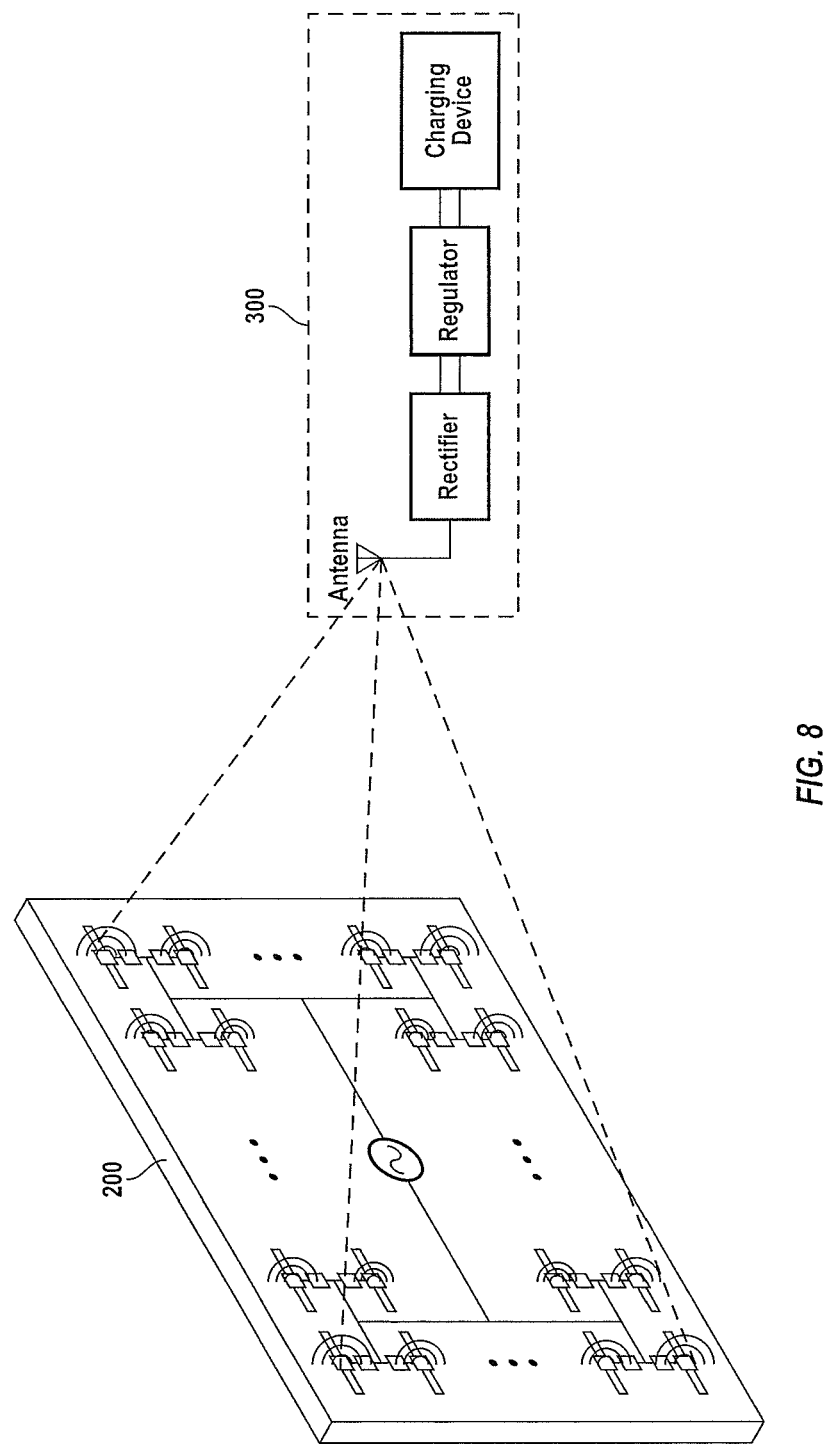
FIG. 8 is a schematic diagram of an RF lens wirelessly charging a device, in accordance with one exemplary embodiment of the present invention.
Figure 9:
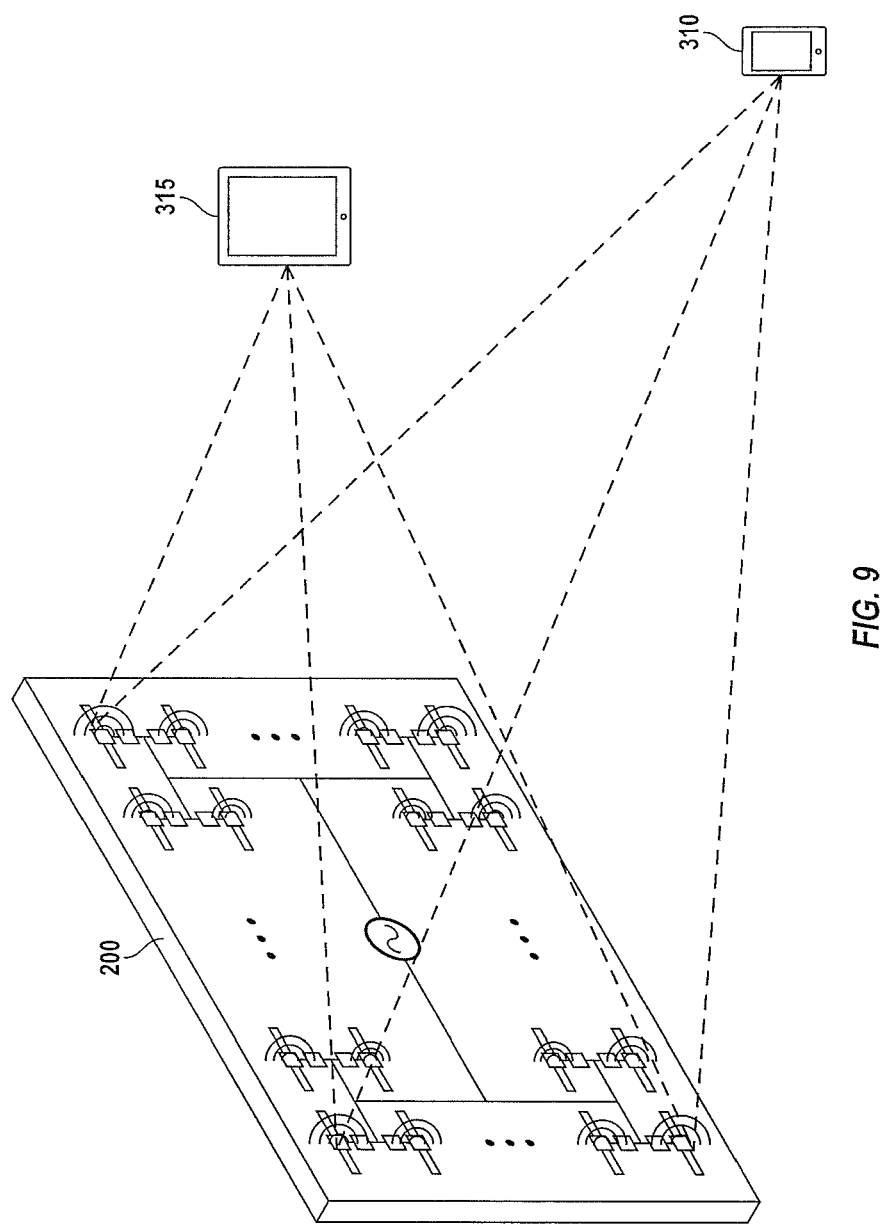
FIG. 9 is a schematic diagram of an RF lens concurrently charging a pair of devices, in accordance with one exemplary embodiment of the present invention.

FIG. 8 is a schematic diagram of RF lens 200 wirelessly charging device 300. In some embodiments, RF lens 200 wirelessly charges multiple devices concurrently. FIG. 9 shows RF lens 200 concurrently charging devices 310, and 315 using focused waves of similar or different strengths.

Figure 10:
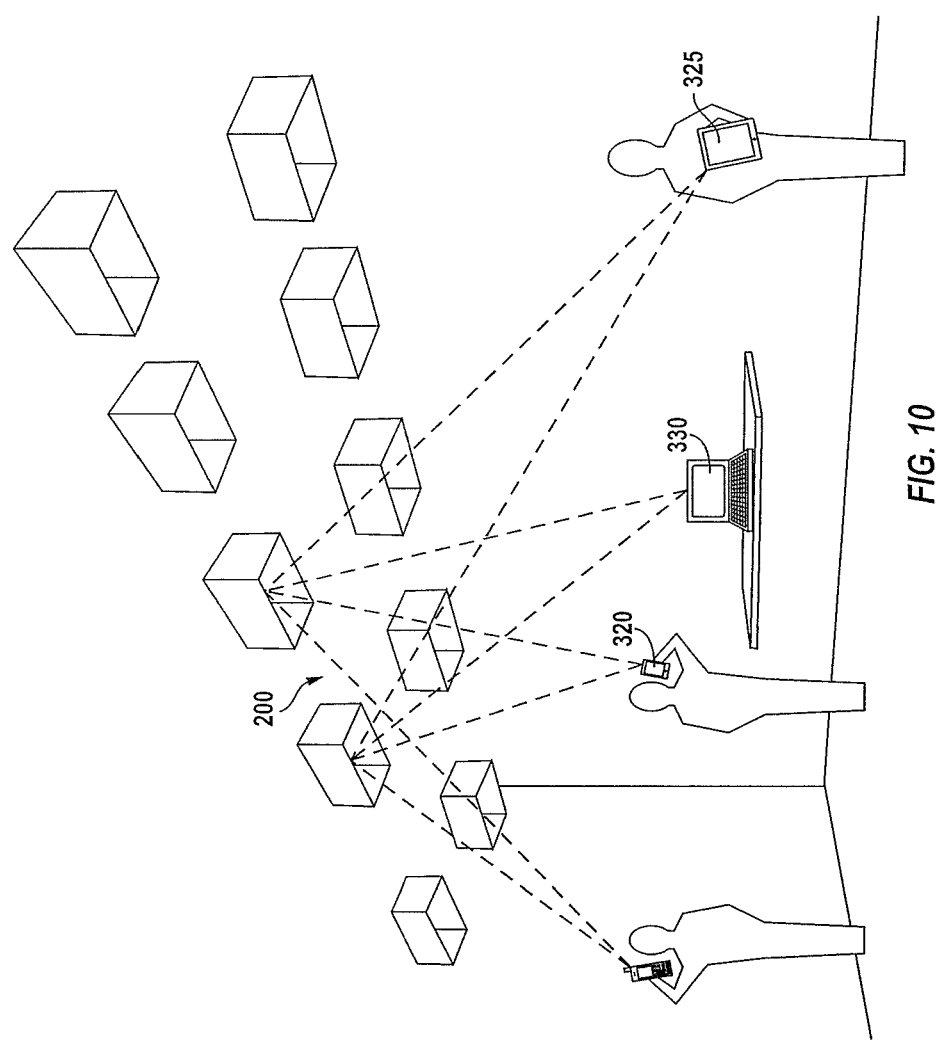
FIG. 10 is a schematic diagram of an RF lens concurrently charging a pair of mobile devices and a stationary device, in accordance with one exemplary embodiment of the present invention.

FIG. 10 shows RF lens 200 wireless charging mobile devices 320, 325 and stationary device 330 all of which are assumed to be indoor.

Figure 11A:
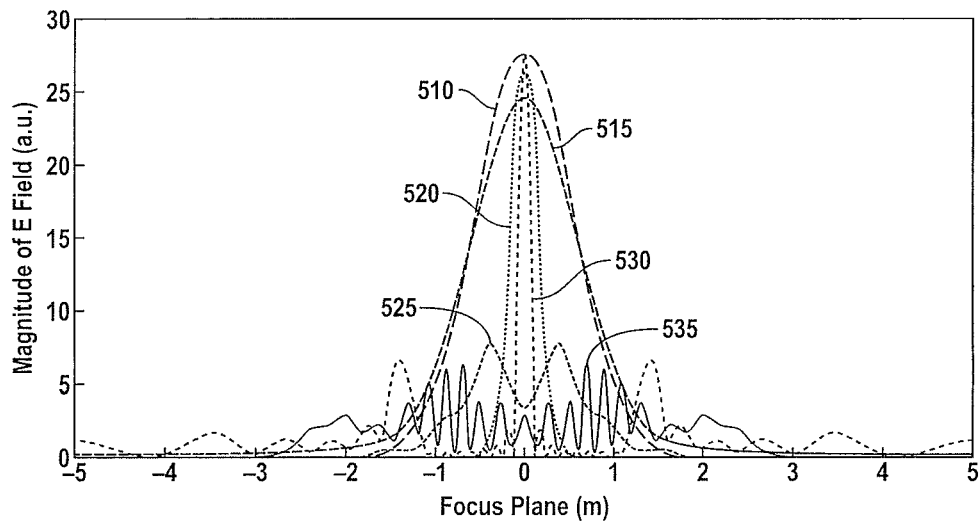
FIG. 11A shows computer simulations of the electromagnetic field profiles of a one-dimensional RF lens, in accordance with one exemplary embodiment of the present invention.
Figure 11B:
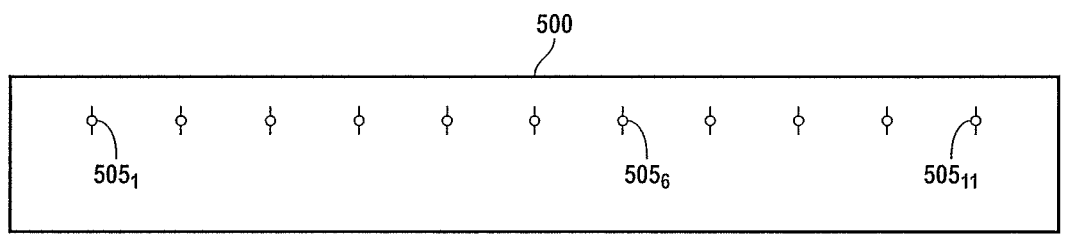
FIG. 11B is a simplified schematic view of an RF lens used in generating the electromagnetic field profiles of FIG. 11A.

FIG. 11A shows computer-simulated electromagnetic field profiles generated by a one-dimensional RF lens at a distance 2 meters away from the RF lens having an array of 11 isotropic radiators. The beam profiles are generated for three different frequencies, namely 200 MHz (wavelength 150 cm), 800 MHz (wavelength 37.5 cm), and 2400 MHz (wavelength 12.50 cm). Since the distance between each pair of adjacent radiators of the RF lens is assumed to be 20 cm, the RF lens has an aperture of 2 m. Therefore, the wavelengths are of the order of aperture size and focal length of the radiator. FIG. 11B is a simplified schematic view of such an RF lens 500 having 11 radiators $505_k$ that are spaced 20 cm apart from one another, where K is an integer ranging from 1 to 11.

Plots 510, 520 and 530 are computer simulations of the electromagnetic field profiles respectively for 200 MHz, 800 MHz, and 2400 signals radiated by radiator 500 when the relative phases of the various radiators are selected so as to account for the path differences from each of radiators $505k$ to the point located 2 meters away from radiator 5056 in accordance with expression (1) above. For each of these profiles, the diffraction limited focus size is of the order of the wavelengths of the radiated signal. Plots 515, 525 and 535 are computer simulations of the electromagnetic field profiles at a distance 2 meters away from the radiator array for 200 MHz, 800 MHz, and 2400 signals respectively when the phases of radiators $505k$ were set equal to one another.

As seen from these profiles, for the larger wavelength having a frequency of 200 MHz (i.e, plots 510, 515), because the path differences from the individual radiators to the focus point are not substantially different, the difference between profiles 510 and 515 is relatively unpronounced. However, for each of 800 MHz and 2400 MHz frequencies, the EM confinement (focus) is substantially more when the relative phases of the various radiators are selected so as to account for the path differences from the radiators $505k$ to the focus point than when radiator phases are set equal to one another. Although the above examples are provided with reference to operating frequencies of 200 MHz, 800 MHz, and 2400 MHz, it is understood that the embodiments of the present may be used in any other operating frequency, such as 5.8 GHz, 10 GHz, and 24 GHz.

Figure 12:
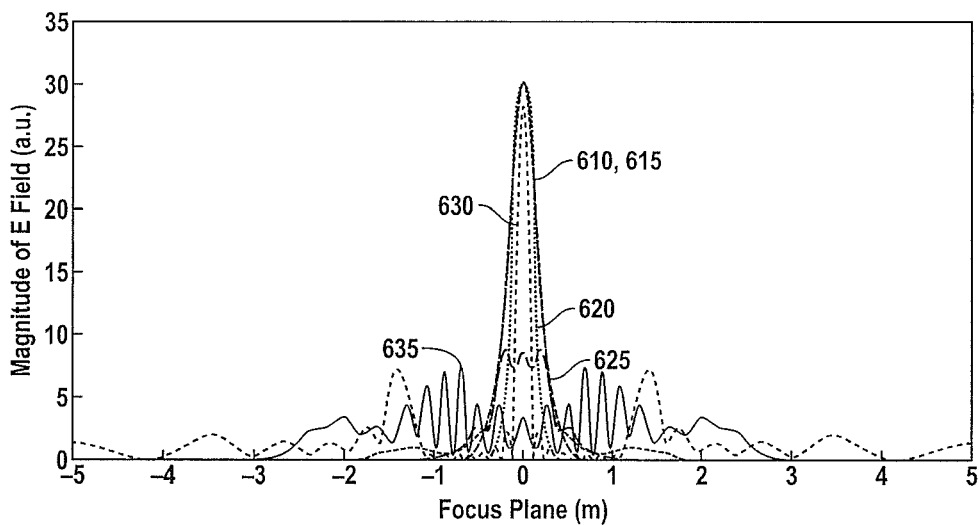
FIG. 12 shows the variations in computer simulated electromagnetic field profiles generated by the RF lens of FIG. 11B as a function of the spacing between each adjacent pair of radiators disposed therein.

FIG. 12 shows the variations in computer simulated electromagnetic field profiles generated by RF lens 500—at a distance of 2 meters away from the RF lens—as a function of the spacing between each adjacent pair of radiators. The RF lens is assumed to operate at a frequency of 2400 MHz. Plots 610, 620, and 630 are computer simulations of the field profiles generated respectively for radiator spacings of 5 cm, 10 cm, and 20 cm after selecting the relative phases of the various radiators to account for the path differences from various radiators $505k$ to the point 2 meters away from the RF lens, in accordance with expression (1) above. Plots 615, 625, and 650 are computer simulations of the field profiles generated respectively for radiator spacings of 5 cm, 10 cm, and 20 cm assuming all radiators disposed in RF lens 500 have equal phases. As is seen from these plots, as the distance between the radiators increases—thus resulting in a larger aperture size—the EM confinement also increases thereby resulting in a smaller focus point.

Figure 13A:
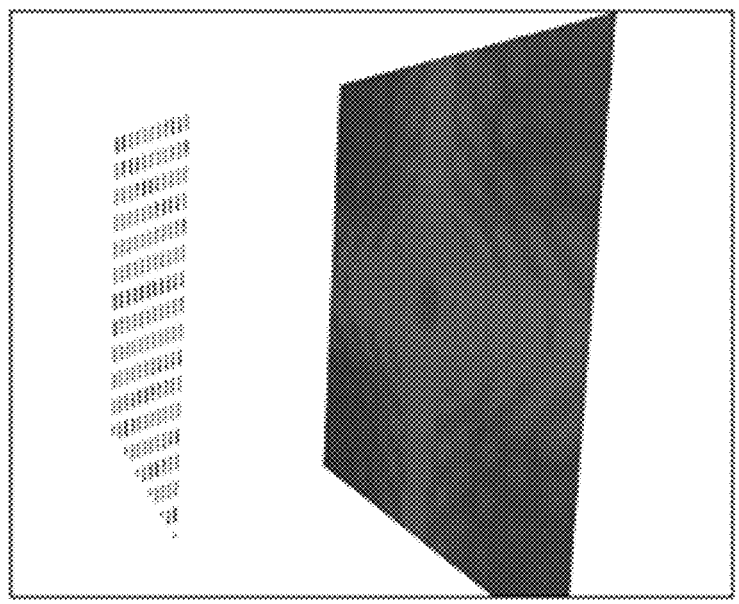
FIG. 13A is an exemplary computer-simulated electromagnetic field profile of an RF lens and using a scale of −15 dB to 0 dB, in accordance with one exemplary embodiment of the present invention.
Figure 13B:
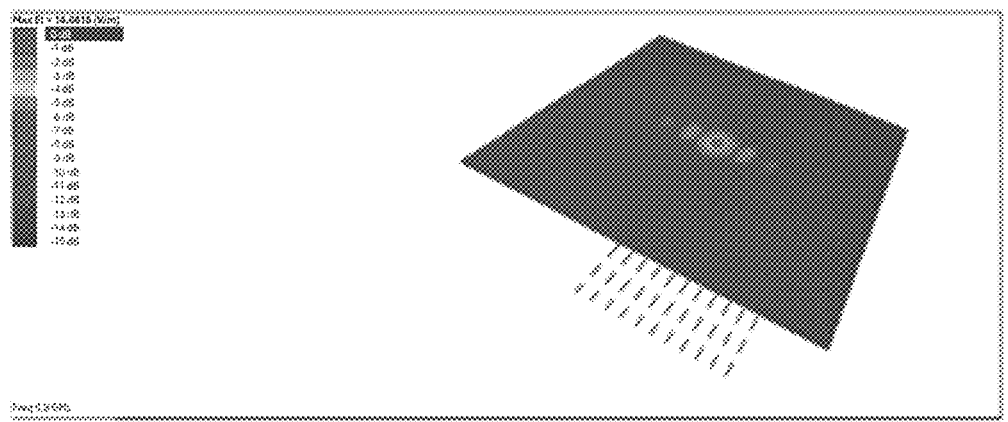
FIG. 13B shows the computer-simulated electromagnetic field profile of FIG. 13A using a scale of −45 dB to 0 dB.

FIG. 13A is the computer simulation of the EM profile of an RF lens at a distance 3 meters away from an RF lens having disposed therein a two-dimensional array of Hertzian dipoles operating at a frequency of 900 MHz, such as RF lens 200 shown in FIG. 5. The spacing between the dipole radiators are assumed to be 30 cm. The relative phases of the radiators were selected so as to account for the path differences from the radiators to the focal point, assumed to be located 3 meters away from the RF lens. In other words, the relative phases of the radiators is selected to provide the RF lens with a focal length of approximately 3 meters. The scale used in generating FIG. 13A is −15 dB to 0 dB. FIG. 13B shows the EM profile of FIG. 13A using a scale of −45 dB to 0 dB.

Figure 14A:
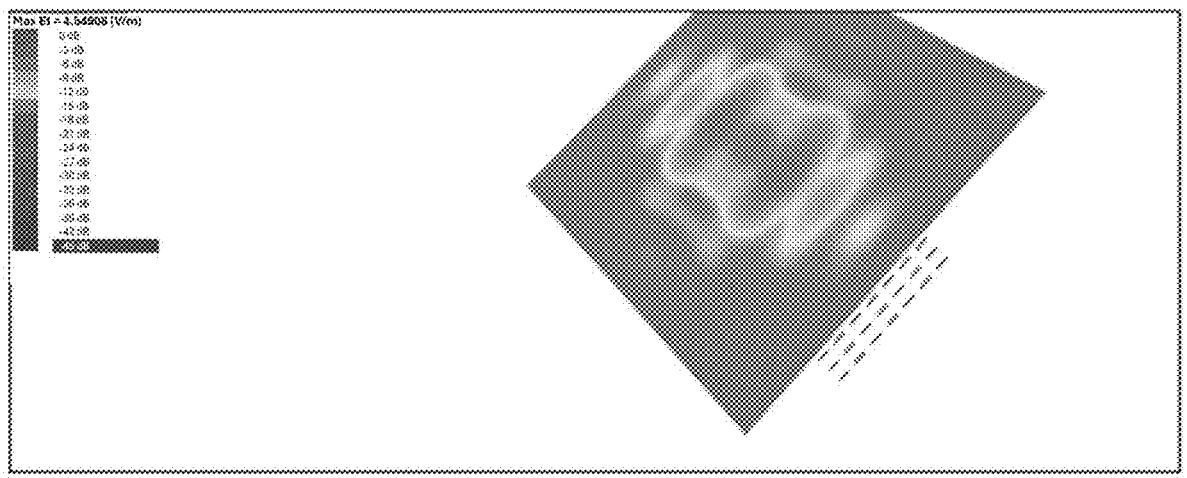
FIG. 14A is an exemplary computer-simulated electromagnetic field profile of the RF lens of FIG. 13A and using a scale of −15 dB to 0 dB, in accordance with one exemplary embodiment of the present invention.
Figure 14B:
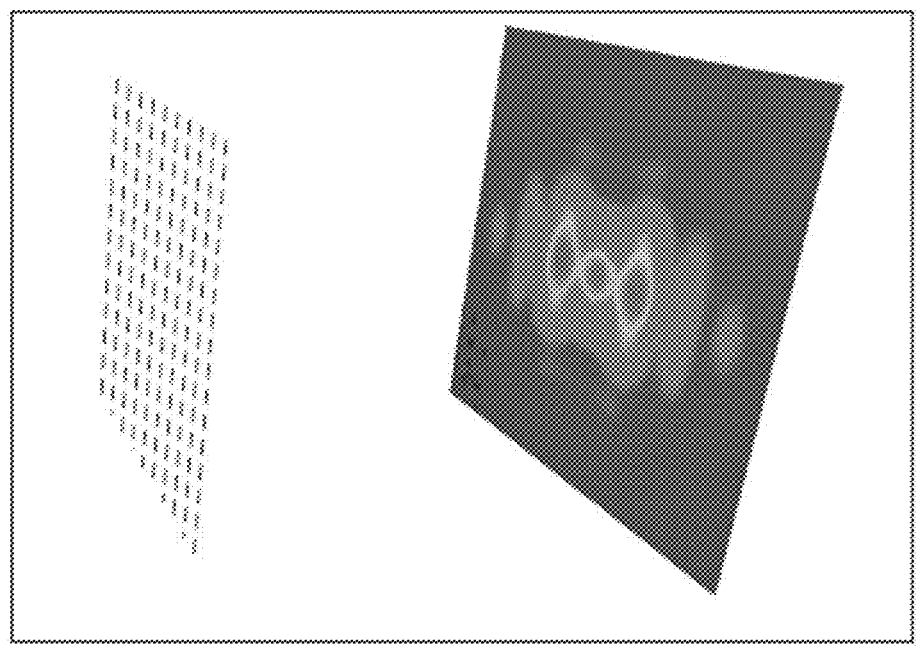
FIG. 14B shows the computer-simulated electromagnetic field profile of FIG. 14A using a scale of −45 dB to 0 dB, in accordance with one exemplary embodiment of the present invention.

FIG. 14A is the computer simulation of the EM profile of the RF lens of FIGS. 13A/13B at a distance 2 meters away from the focal point, i.e., 5 meters away from the RF lens. As is seen from FIG. 14A, the radiated power is diffused over a larger area compared to those shown in FIGS. 13A and 13B. The scale used in generating FIG. 14A is −15 dB to 0 dB. FIG. 14B shows the EM profile of FIG. 14A using a scale of −45 dB to 0 dB.

Figure 15A:
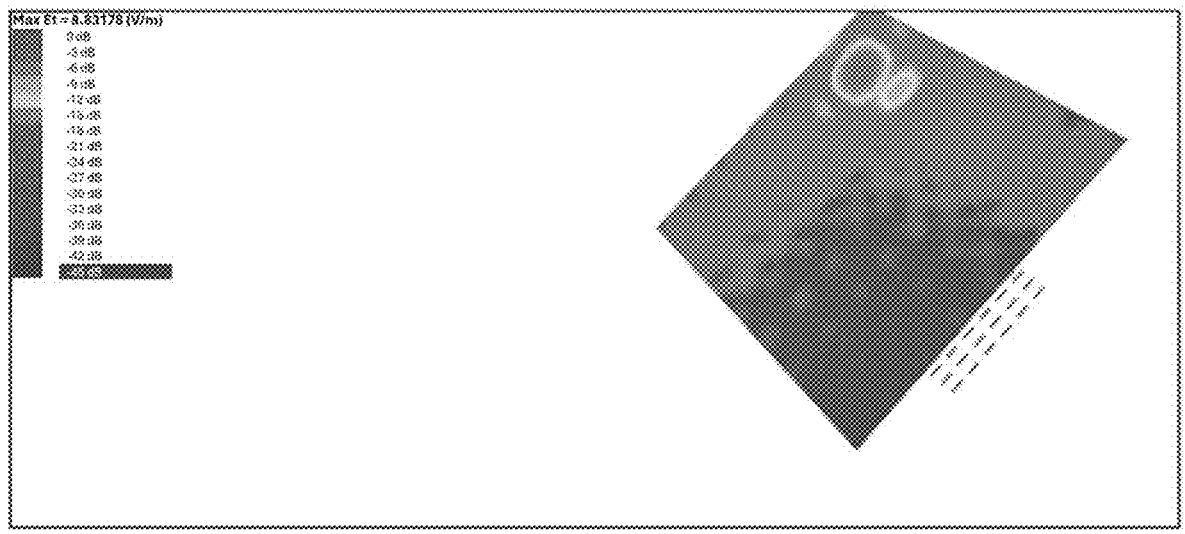
FIG. 15A is an exemplary computer-simulated electromagnetic field profile of an RF lens and using a scale of −15 dB to 0 dB, in accordance with one exemplary embodiment of the present invention.
Figure 15B:
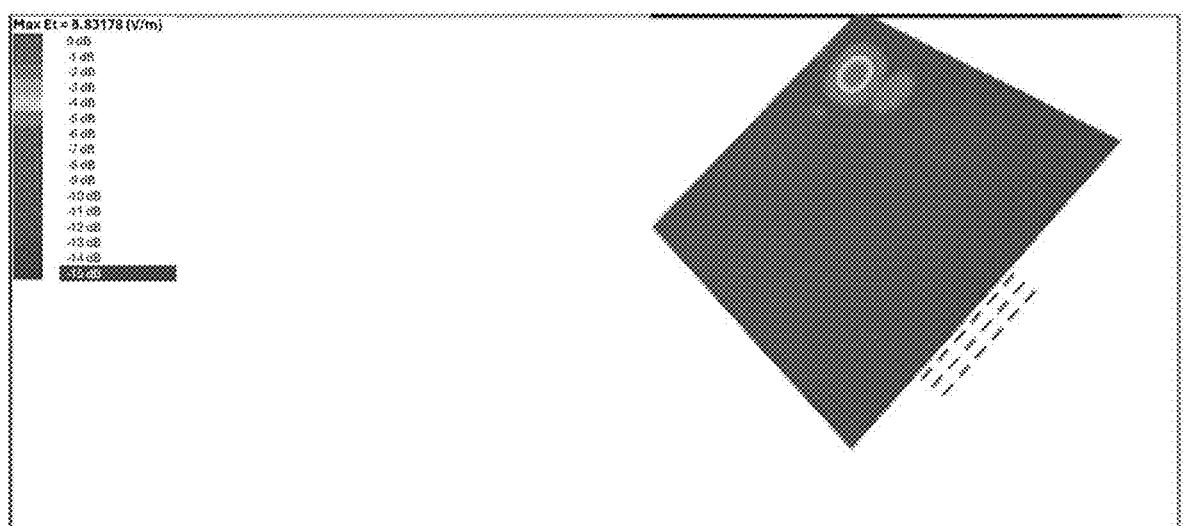
FIG. 15B shows the computer-simulated electromagnetic field profile of FIG. 15A using a scale of −45 dB to 0 dB, in accordance with one exemplary embodiment of the present invention.

FIG. 15A is the computer simulation of the EM profile of an RF lens at a distance 3 meters away from the RF lens having disposed therein a two-dimensional array of Hertzian dipoles operating at a frequency of 900 MHz. The spacing between the dipole radiators are assumed to be 30 cm. The relative phases of the radiators are selected so as to account for the path differences from the radiators to the focal point, assumed to be located 3 meters away from the RF lens and at an offset of 1.5 m from the focal plane of the RF lens, i.e., the focus point has a y-coordinate of 1.5 meters from the focal plane (see FIG. 4). The scale used in generating FIG. 15A is −15 dB to 0. FIG. 15B shows the EM profile of FIG. 15A using a scale of −45 dB to 0 dB.

Figure 16A:
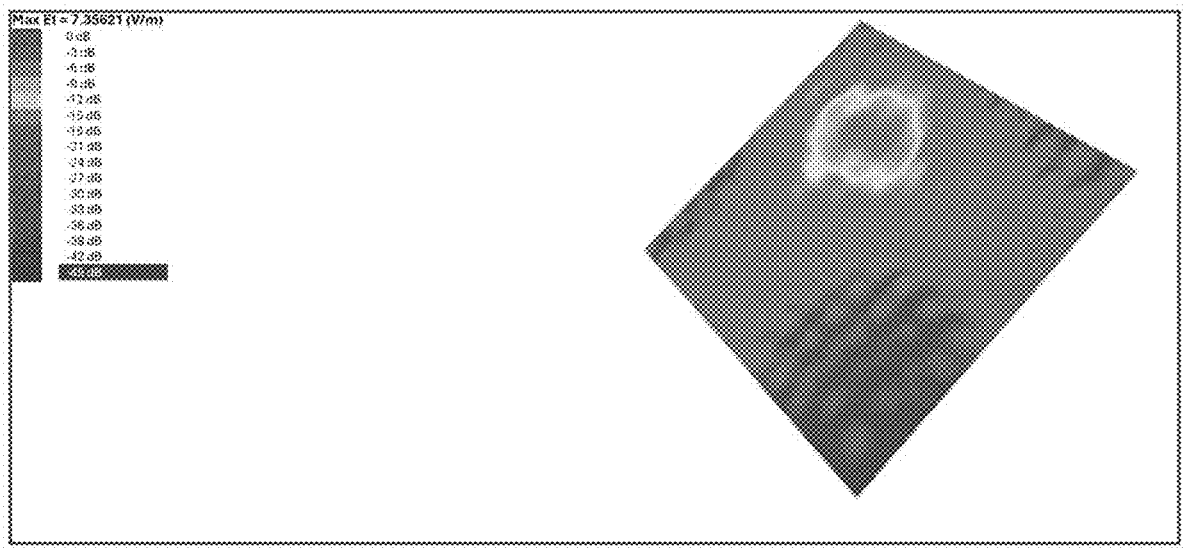
FIG. 16A is an exemplary computer-simulated electromagnetic field profile of the RF lens of FIG. 15A using a scale of −15 dB to 0 dB, in accordance with one exemplary embodiment of the present invention.
Figure 16B:
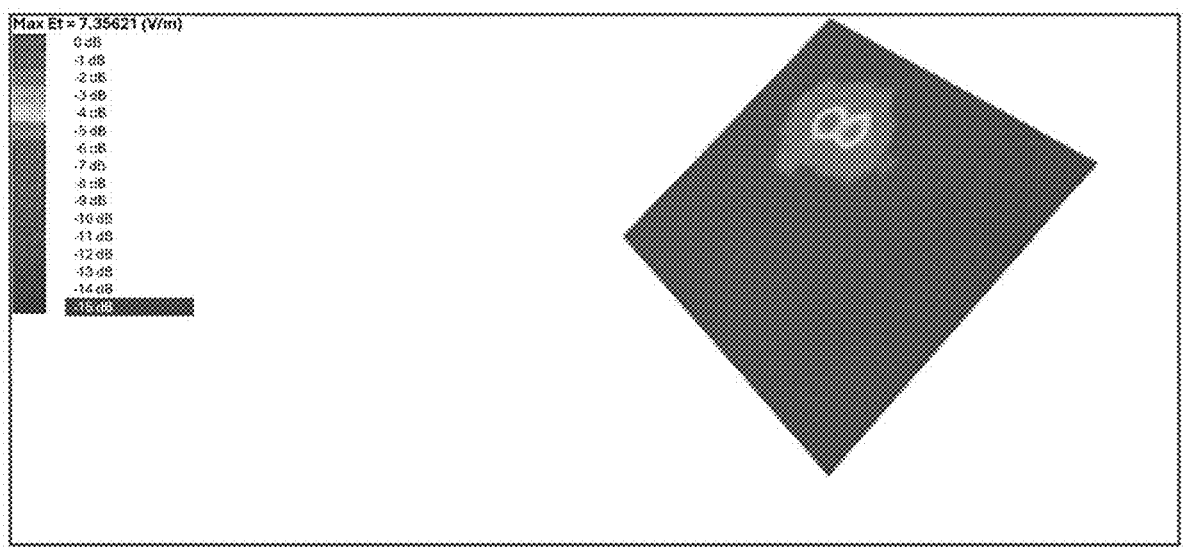
FIG. 16B shows the computer-simulated electromagnetic field profile of FIG. 16A using a scale of −45 dB to 0 dB, in accordance with one exemplary embodiment of the present invention.

FIG. 16A is the computer simulation of the EM profile of the RF lens of FIGS. 15A/15B at a distance 2 meters away from the focal point, i.e., 5 meters away from the x-y plane of the RF lens. As is seen from FIG. 16A, the radiated power is diffused over a larger area compared to that shown in FIG. 15A. The scale used in generating FIG. 16A is −15 dB to 0 dB. FIG. 16B shows the EM profile of FIG. 16A using a scale of −45 dB to 0 dB. The EM profiles shown in FIGS. 13A, 13B, 14A, 14B 15A, 15B, 16A, 16B demonstrate the versatility of an RF lens, in accordance with the present invention, in focusing power at any arbitrary point in 3D space.

Figure 17A:
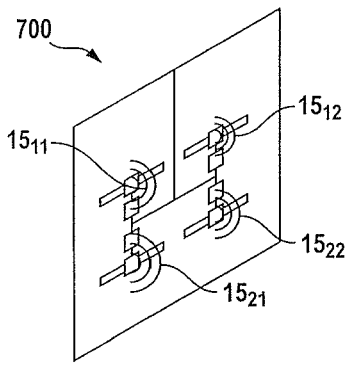
FIG. 17A shows an exemplary radiator tile having disposed therein four radiators, in accordance with one exemplary embodiment of the present invention.
Figure 17B:
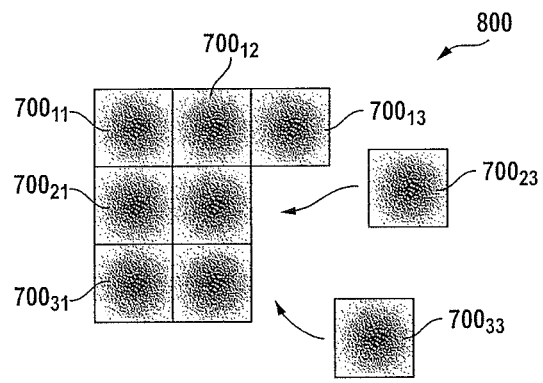
FIG. 17B shows an RF lens formed using a multitude of the radiator tiles of FIG. 17A, in accordance with one exemplary embodiment of the present invention.

In accordance with one aspect of the present invention, the size of the array forming an RF lens is configurable and may be varied by using radiator tiles each of which may include one or more radiators. FIG. 17A shows an example of a radiator tile 700 having disposed therein four radiators $15_{11}$, $15_{12}$, $15_{21}$, and $15_{22}$. Although radiator tile 700 is shown as including four radiators, it is understood that a radiator tile, in accordance with one aspect of the present invention, may have fewer (e.g., one) or more than (e.g., 6) four radiators. FIG. 17B shown an RF lens 800 initially formed using 7 radiator tiles, namely radiator tiles $700_{11}$, $700_{12}$, $700_{13}$, $700_{21}$, $700_{22}$, $700_{31}$, $700_{31}$—each of which is similar to radiator tile 700 shown in FIG. 17A—and being provided with two more radiator tiles $700_{23}$ and $700_{33}$. Although not shown, it is understood that each radiator tile includes the electrical connections necessary to supply power to the radiators and deliver information from the radiators as necessary. In one embodiment, the radiators formed in the tiles are similar to radiator 202 shown in FIG. 6.

In accordance with one aspect of the present invention, the RF lens is adapted to track the position of a mobile device in order to continue the charging process as the mobile device changes position. To achieve this, in one embodiment, a subset or all of the radiators forming the RF lens include a receiver. The device being charged also includes a transmitter adapted to radiate a continuous signal during the tracking phase. By detecting the relative differences between the phases (arrival times) of such a signal by at least three different receivers formed on the RF lens, the position of the charging device is tracked.

Figure 18:
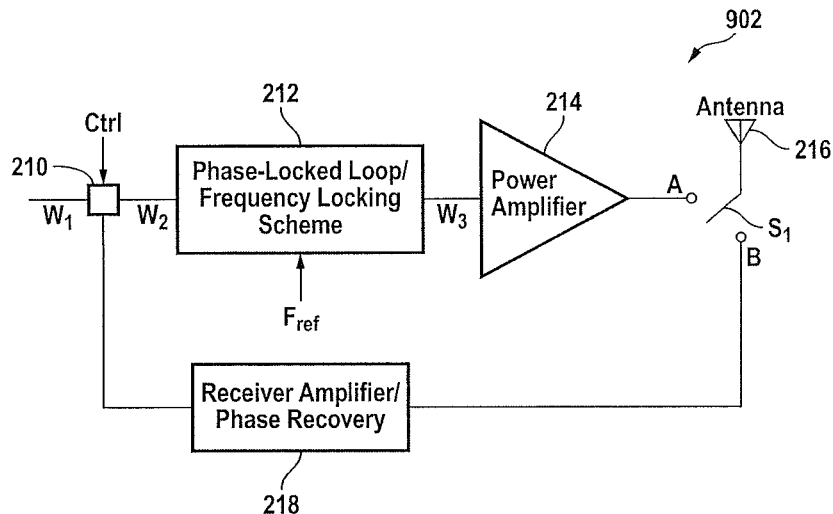
FIG. 18 is a simplified block diagram of a radiator disposed in an RF lens, in accordance with another exemplary embodiment of the present invention.

FIG. 18 is a simplified block diagram of a radiator 902 disposed in an RF lens, such as RF lens 200 shown in FIG. 5, in accordance with one embodiment of the present invention. Radiator 902 is similar to radiator 202 shown in FIG. 6, except that radiator 902 has a receiver amplifier and phase recovery circuit 218, and a switch $S_1$. During power transfer, switch $S_1$ couples antenna 216 via node A to power amplifier 214 disposed in the transmit path. During tracking, switch $S_1$ couples antenna 216 via node B to receiver amplifier and phase recovery circuit 218 disposed in the receive path to receive the signal transmitted by the device being charged.

Figure 19:
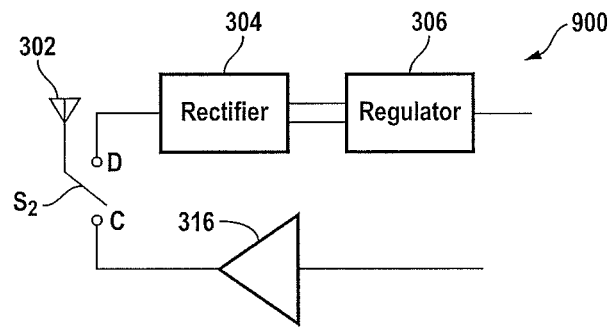
FIG. 19 shows a number of electronic components disposed in a device adapted to be charged wirelessly, in accordance with another exemplary embodiment of the present invention.
Figure 20:
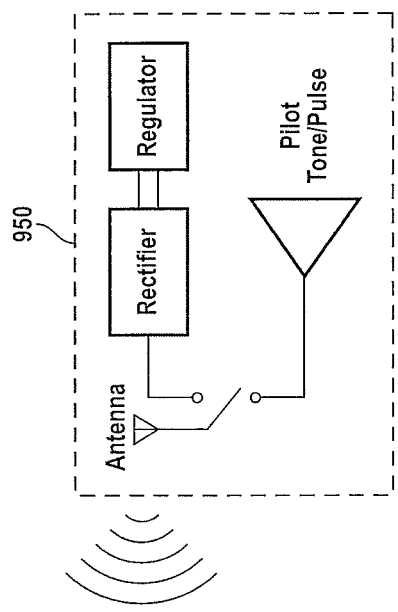
FIG. 20 shows an RF lens tracking a device using a signal transmitted by the device, in accordance with another exemplary embodiment of the present invention.
Figure 20:
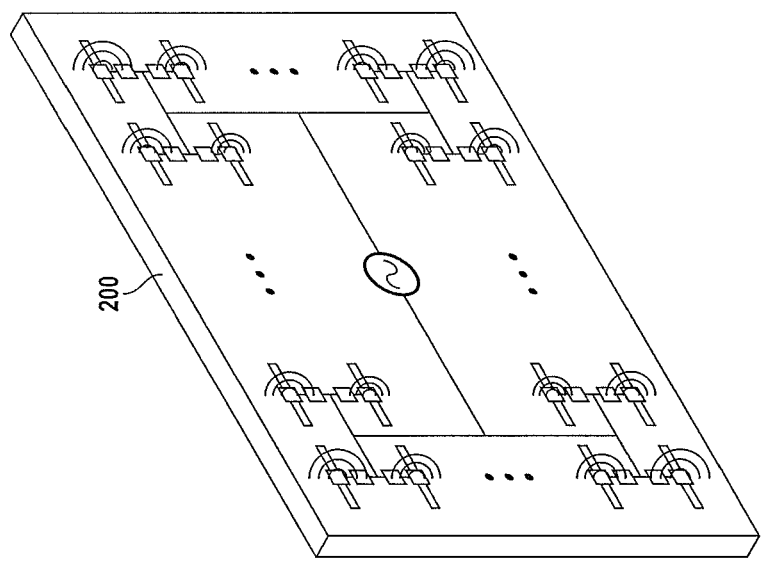

FIG. 19 shows a number of components of a device 900 adapted to be charged wirelessly, in accordance with one embodiment of the present invention. Device 900 is similar to device 300 shown in FIG. 7, except that device 900 has a transmit amplifier 316, and a switch $S_2$. During power transfer, switch $S_2$ couples antenna 302 via node D to rectifier 304 disposed in receive path. During tracking, switch $S_2$ couples antenna 302 via node C to transmit amplifier 316 to enable the transmission of a signal subsequently used by the RF lens to detect the position of device 300. FIG. 20 shows RF lens 200 tracking device 900 by receiving the signal transmitted by device 900.

A radiator, in accordance with any of the embodiments of the present invention, in addition to transferring RF power to a device wirelessly, may also wirelessly transfer modulated data to such a device. For example, a radiator, in accordance with the embodiments of the present invention, may operate as a wireless local area network (WLAN) router to direct signal power toward other such routers or receivers (WLAN or otherwise) to increase the received signal power by orders of magnitude and thereby increase the range, coverage and wireless data rates, as well as reduce the effect of multi-path propagation of the RF signal and power. Transferring wireless signal and/or power, in accordance with embodiments of the present invention and in conformity with any communication standards, such as WiFi, Zigbee, Bluetooth, GSM, GPRS, Edge, and UMTS, to a receiving device, and tracking the location of the device as it moves through physical space, greatly increases the range of the data link and achievable data rates.

Because the power levels required for data transmission are typically orders of magnitude lower than the power levels for wireless power transfer, in accordance with embodiments of the present invention, both power and data transmission may be performed concurrently. In other words, for any given amount of emitted power by a generation unit, in accordance with embodiments of the present invention, the range of wireless power transfer is smaller than the range for wireless data transmission. Therefore, a device that is in range for wireless power transfer, is also in range for wireless data transmission. Furthermore, the amount of power siphoned off in detecting the transmitted data signal is typically much smaller compared to the power available for concurrently powering the device. In addition, a device that may be charged wirelessly can also operate over the relatively narrow range of frequencies around the center frequency spanned by most signal modulation schemes used in data transmission.

Figure 21A:
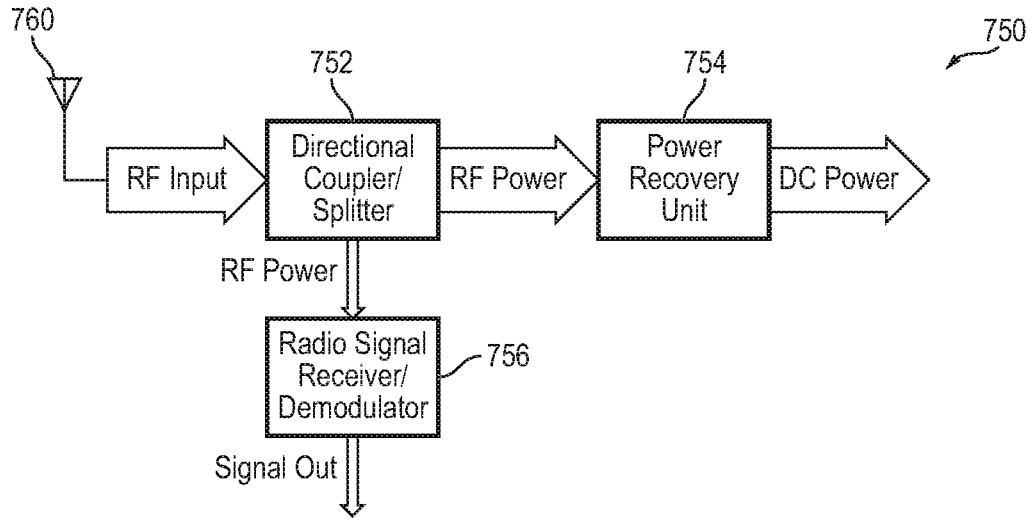
FIG. 21A is a simplified high-level block diagram of a device, in accordance with one embodiment of the present invention.

FIG. 21A is a simplified high-level block diagram of a device 750 (e.g., cellular phone, camera, wearable device, toy), in accordance with one embodiment of the present invention. Device 750 is shown as including, in part, an antenna 760, a directional power splitter/coupler (alternatively referred to herein as coupler) 752, a power recovery unit 754, and a radio signal receiver/demodulator (alternatively referred to herein as receiver) 756. Antenna 760 is adapted to receive a signal from a radiator or an array of radiators, as described for example above, and deliver the received signal to coupler 752. The signal received by the antenna is a modulated signal that carries information/data as well as RF power, both of which are transmitted using the same frequency. Coupler 752 is adapted to transfer a first portion of the received RF signal to receiver 756 and a second portion of the received signal to power recovery unit 754. Receiver 756 demodulates the received signal to recover the transmitted data. Power recovery unit 754 is adapted to convert the received RF signal to a DC power to power device 750 or charge device 750's battery. Although not shown, it is understood that device 750 may use filters and/or transistors instead of coupler 752 to distribute the received RF power between power recovery unit 754 and receiver 756. U.S. application Ser. No. 14/552,249, filed Nov. 24, 2014, entitled "Active CMOS Recovery Units For Wireless Power Transmission", the content of which is incorporated herein by reference in its entirety, describes in detail various embodiments of power recovery unit 754. In one embodiment, directional coupler/splitter 752 is adjustable (via a controller not shown in FIG. 21A) that can vary the split ratio so as to change the amount of power coupler/splitter 752 provides to receiver 756 relative to the power it provides to power recovery unit 754.

Figure 21B:
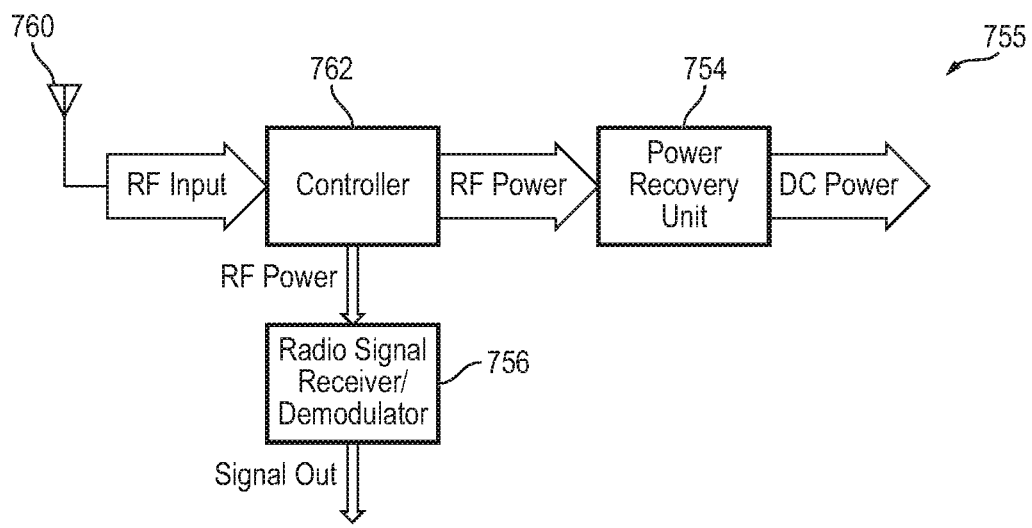
FIG. 21B is a simplified high-level block diagram of a device, in accordance with one embodiment of the present invention.

FIG. 21B is a simplified high-level block diagram of a device 755, in accordance with one embodiment of the present invention. Device 750 is shown as including, in part, an antenna 760, a controller 762, a power recovery unit 754, and a radio signal receiver/demodulator (hereinafter receiver) 756. Antenna 760 is adapted to receive a signal from a radiator or an array of radiators, as described above, and deliver the received signal to controller 762. Controller 762 is adapted to distribute the received RF power in accordance with an inverse ratio of the impedances of receiver 756 and power recovery unit 754. Controller 762 may be further adapted to vary the impedances seen at its output terminals such that the output impedance having a closer value to the impedance seen at the input of controller 762 receives a higher amount of the received RF power.

Figure 21C:
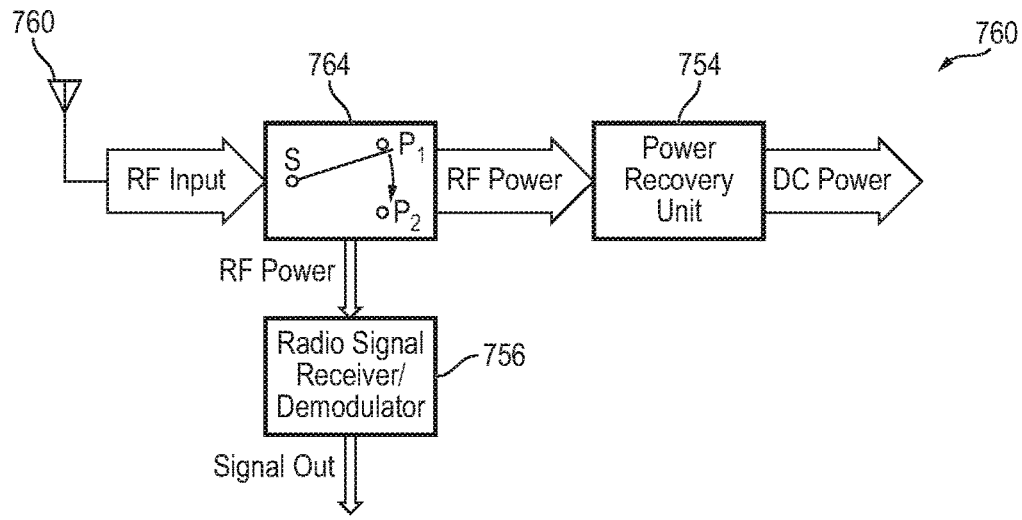
FIG. 21C is a simplified high-level block diagram of a device, in accordance with one embodiment of the present invention.

FIG. 21C is a simplified high-level block diagram of a device 760, in accordance with another embodiment of the present invention. Device 760 is similar to device 750 except that device 760 uses a switch 764 in place of coupler 752. When switch 764 is in position $P_1$, all of the received RF power is delivered to power recovery unit 754 thereby to charge device 760. When switch 764 is in position $P_2$, all of the received RF power is delivered to receiver 756 to receive the transmitted data. For example, if device 760 is determined as being out-of-range for wireless power charging, switch 764 is placed in position $P_2$ to supply all of the received wireless power to receiver 756 to improve, e.g., its signal to noise ratio. Likewise, if device 760 is detected as being within range but requiring no additional charge, switch 764 is placed in position $P_2$ to supply all of the received wireless power to receiver 756. If, for example, data reception is not of interest, switch 764 is placed in position $P_1$ to supply all of the received RF power to power recovery unit 754.

For example, assume that an RF lens or a radiator array (a power generating unit) broadcasts an RF signal to determine if the received RF signal is strong enough to wirelessly charge a device receiving the RF signal. If the received RF signal is detected as not being strong enough to wirelessly charge the device, a controller (not shown in FIG. 21C) controlling switch 764 may switch to radio receiving mode by placing switch 764 to position $P_2$. Once in the radio receiving mode, the device may then communicate with the radiator array to enable the radiator array to focus its RF power on the device. After the radiator array focuses its transmitted RF signal on device 760, thereby causing the received RF signal to be sufficient for wireless charging, the controller may place switch 764 in position $P_1$ to enable power recovery unit 754 to charge device 760. When device 760 is charged to a sufficient level, it may so inform the controller thus causing switch 764 to be placed in switch position $P_2$. It is understood that any number of conditions and criteria may be used to change the position of switch 764.

Figure 21D:
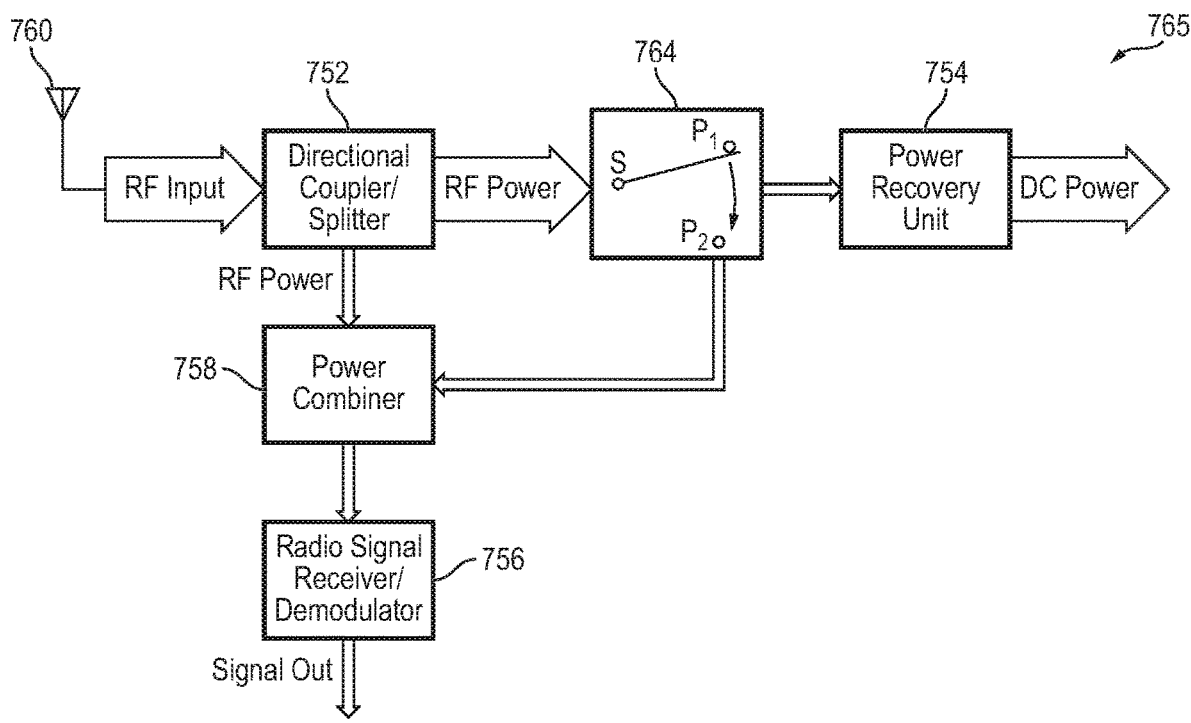
FIG. 21D is a simplified high-level block diagram of a device, in accordance with one embodiment of the present invention.

FIG. 21D is a simplified high-level block diagram of a device 765, in accordance with another embodiment of the present invention. Device 765 is shown as including, in part, an antenna 760, a coupler 752, a switch 764, a power combiner 758, a power recovery unit 754, and a receiver 756. Antenna 760 is adapted to receive a modulated signal that carries information as well as RF power, both of which are transmitted using the same frequency. Coupler 752 is adapted to transfer a first portion of the received RF signal to power combiner 758, and a second portion of the received signal to switch 764. When switch 764 is position $P_1$, (i) the first portion of the power supplied by coupler 752 is delivered to receiver 756 via power combiner 758, and (ii) the second portion of the power supplied by coupler 752 is delivered to power recovery unit 754 to wirelessly charge device 765. Receiver 756 demodulates the received signal to recover the transmitted data.

When switch 764 is position $P_2$, power combiner 758 combines the first portion of the power it receives from coupler 752 with the second portion of power it receives from switch 764 and delivers the combined power to receiver 756. Accordingly, in such embodiments, receiver 756 continues to receive the transmitted RF signal regardless of the switch position. For example, when the received RF power is detected as being below a threshold value, switch 764 is placed in position $P_2$ (via a controller not shown) so that all the received RF power is used for signal reception. When the received RF power is detected as being above a threshold value and/or device 765 requests to be charged, switch 764 is placed in position $P_1$ (via the controller) so that a relatively small fraction of the received RF power is used for signal detection by receiver 756, and the remainder of the RF power is used by power recovery unit 754 to charge device 765.

Figure 21E:
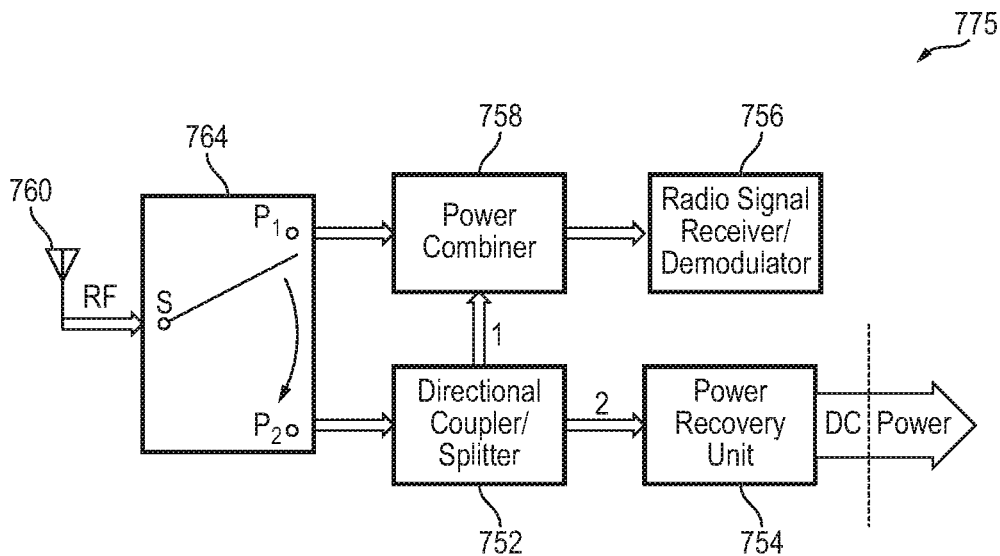
FIG. 21E is a simplified high-level block diagram of a device, in accordance with one embodiment of the present invention.

FIG. 21E is a simplified high-level block diagram of a device 775, in accordance with another embodiment of the present invention. Device 775 is shown as including, in part, an antenna 760, a coupler 752, a switch 764, a power combiner 758, a power recovery unit 754, and a receiver 756. Antenna 760 is adapted to receive a modulated signal that carries information/data as well as RF power, both of which are transmitted using the same frequency. Receiver 756 demodulates the received signal to recover the transmitted data.

When switch 764 is position $P_2$, the received RF signal is supplied to directional coupler 752, which in turn, delivers (i) a first portion of the received power to receiver 756 via power combiner 758, and (ii) a second portion of the received power to power recovery unit 754 for wirelessly charging device 775. When switch 764 is in position $P_1$, substantially all of the received RF power is delivered to receiver 756 via power combiner 758. Accordingly, device 775 is adapted to continuously deliver the RF signal to receiver 756.

Figure 21F:
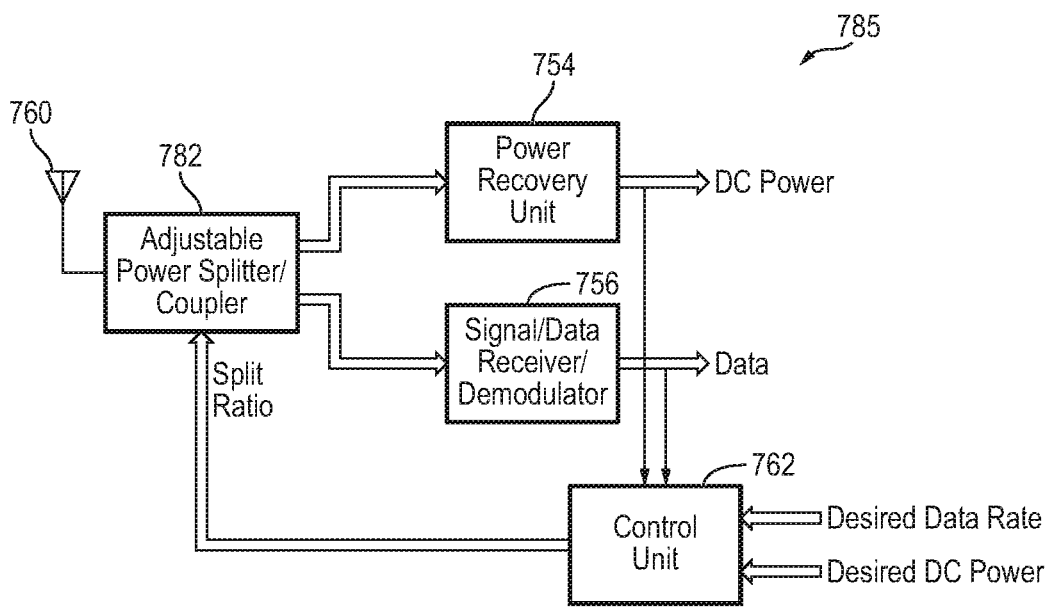
FIG. 21F is a simplified high-level block diagram of a device, in accordance with one embodiment of the present invention.

FIG. 21F is a simplified high-level block diagram of a device 785, in accordance with another embodiment of the present invention. Device 785 is shown as including, in part, an antenna 760, an adjustable power splitter/coupler 782, a control unit 762, a power recovery unit 754, and a receiver 756. Antenna 760 is adapted to receive a modulated signal that carries information as well as RF power, both of which are transmitted using the same frequency. Adjustable power splitter/coupler 782 is adapted to split the RF signal it receives from antenna 760 into first and second portions in accordance with a split ratio adjustable power splitter/coupler 782 receives from control unit 762. The split ratio supplied by control unit 762 may be defined by any number of factors, such as the target date rate set by receiver 756, the DC power requested by the power recovery unit 754, the power requested by receiver 756, and the like.

Referring to FIGS. 21A-21E, it is understood that power combiner 758 may be formed using any arrangement or configuration of active and/or passive devices capable of combining power from two or more sources. Typical examples include lossless power combiners such as coupled transmission lines, their lumped circuit equivalent using capacitors or inductors, magnetic transformers, and other circuits, as is well known. Directional coupler 752 may include coupled transmission lines, transformers and/or their lumped circuit equivalent. Switch 764 adapted to switch RF power may include pass gates, electronically tunable impedance networks, relays and the like, as is also well known.

In accordance with another embodiment of the present invention, a pulse based measurement technique is used to track the position of the mobile device. To achieve this, one or more radiators forming the RF lens transmit a pulse during the tracking phase. Upon receiving the pulse, the device being tracked sends a response which is received by the radiators disposed in the array. The travel time of the pulse from the RF lens to the device being tracked together with the travel times of the response pulse from the device being tracked to the RF lens is representative of the position of the device being tracked. In the presence of scatterers, the position of the device could be tracked using such estimation algorithms as maximum likelihood, or least-square, Kalman filtering, a combination of these techniques, or the like. The position of the device may also be determined and tracked using WiFi and GPS signals.

Figure 22:
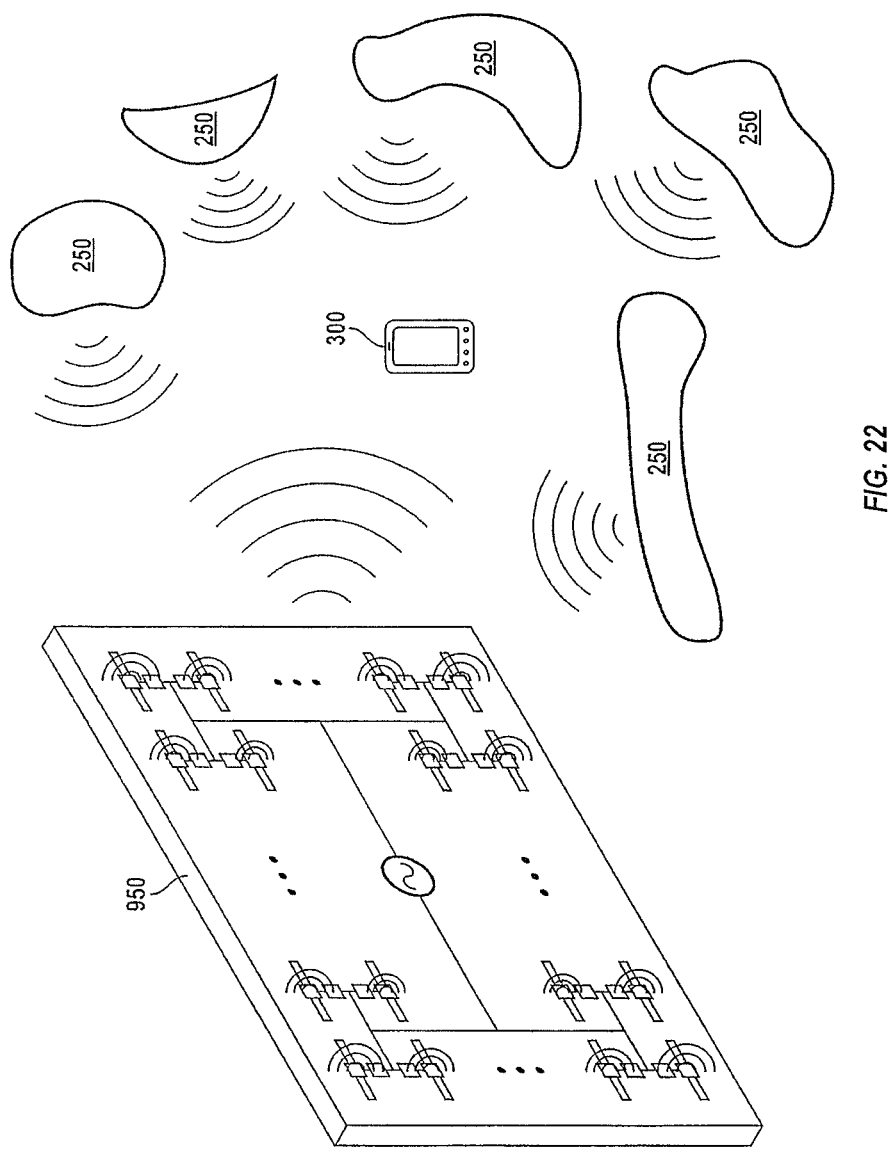
FIG. 22 shows an RF lens transferring power to a device in the presence of a multitude of scattering objects, in accordance with another exemplary embodiment of the present invention.
Figure 23A:
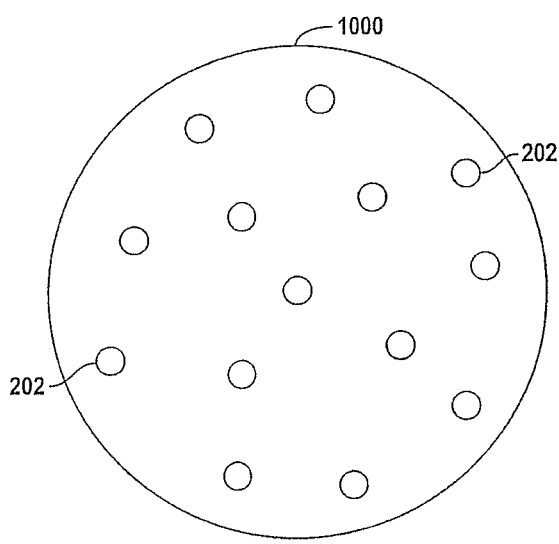
FIG. 23A shows an RF lens formed using a multitude of radiators arranged in a circular shape, in accordance with one embodiment of the present invention.
Figure 23B:
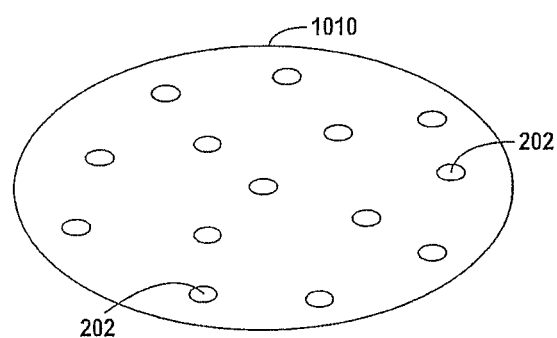
FIG. 23B shows an RF lens formed using a multitude of radiators arranged in an elliptical shape, in accordance with one embodiment of the present invention.

The presence of scattering objects, reflectors and absorbers may affect the RF lens' ability to focus the beam efficiently on the device undergoing wireless charging. For example, FIG. 22 shows an RF lens 950 transferring power to device 300 in the presence of a multitude of scattering objects 250. To minimize such effects, the amplitude and phase of the individual radiators of the array may be varied to increase power transfer efficiency. Any one of a number of techniques may be used to vary the amplitude or phase of the individual radiators.

In accordance with one such technique, to minimize the effect of scattering, a signal is transmitted by one or more of the radiators disposed in the RF lens. The signal(s) radiated from the RF lens is scattered by the scattering objects and received by the radiators (see FIG. 18). An inverse scattering algorithm is then used to construct the scattering behavior of the environment. Such a construction may be performed periodically to account for any changes that may occur with time. In accordance with another technique, a portion or the entire radiator array may be used to electronically beam-scan the surroundings to construct the scattering behavior from the received waves. In accordance with yet another technique, the device undergoing wireless charging is adapted to periodically send information about the power it receives to the radiator. An optimization algorithm then uses the received information to account for scattering so as to maximize the power transfer efficiency.

In some embodiments, the amplitude/phase of the radiators or the orientation of the RF lens may be adjusted to take advantage of the scattering media. This enable the scattering objects to have the proper phase, amplitude and polarization in order to be used as secondary sources of radiation directing their power towards the device to increase the power transfer efficiency.

The above embodiments of the present invention are illustrative and not limitative. Embodiments of the present invention are not limited by number of radiators disposed in an RF lens, nor are they limited by the number of dimensions of an array used in forming the RF lens. Embodiments of the present invention are not limited by the type of radiator, its frequency of operation, and the like. Embodiments of the present invention are not limited by the type of device that may be wirelessly charged. Embodiments of the present invention are not limited by the type of substrate, semiconductor, flexible or otherwise, in which various components of the radiator may be formed. Other additions, subtractions or modifications are obvious in view of the present disclosure and are intended to fall within the scope of the appended claims.

What is claimed is:

1. A device comprising:
   an antenna adapted to receive an RF signal comprising modulated data;
   a demodulator adapted to demodulate the data from a first portion of the RF signal;
   a power recovery unit adapted to convert a second portion of the RF signal to a DC power to power the device; and
   a controller adapted to receive the RF signal from the antenna and generate the first and second portions of the RF signal in accordance with a ratio of impedance values of the demodulator and the power recovery unit at the output of the controller.

2. The device of claim 1 wherein said device is a mobile device.

3. The device of claim 1 further comprising a voltage regulator configured to regulate the DC power.

4. The device of claim 1 wherein the controller is adapted to vary the impedance value of the receiver.

5. The device of claim 4 wherein the controller is adapted to vary the impedance value of the power recovery unit.

6. The device of claim 5 wherein said controller is further adapted to:
   set the first portion to be greater than said second portion upon determining that an impedance value at an input of the controller is closer to the impedance value of the receiver than to the impedance value of the power recovery unit.

7. The device of claim 6 wherein said controller is further adapted to:
   set the second portion to be greater than said first portion upon determining that the impedance value at the input of the controller is closer to the impedance value of the power recovery unit than to the impedance value of the receiver.

* * * * *